US008001398B2

(12) United States Patent
Tamasaki

(10) Patent No.: US 8,001,398 B2
(45) Date of Patent: Aug. 16, 2011

(54) POWER SOURCE CONTROL METHOD OF IMAGE FORMING APPARATUS, POWER SOURCE CONTROL SYSTEM OF IMAGE FORMING APPARATUS, POWER SOURCE CONTROL APPARATUS, IMAGE FORMING APPARATUS AND COMPUTER PROGRAM PRODUCT

(75) Inventor: Takashi Tamasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 833 days.

(21) Appl. No.: 11/880,625

(22) Filed: Jul. 23, 2007

(65) Prior Publication Data

US 2008/0028241 A1 Jan. 31, 2008

(30) Foreign Application Priority Data

Jul. 24, 2006 (JP) ................................ 2006-201106

(51) Int. Cl.
*G06F 1/26* (2006.01)

(52) U.S. Cl. ....................................... 713/310; 713/300

(58) Field of Classification Search .................. 713/300, 713/310

See application file for complete search history.

(56) References Cited

U.S. PATENT DOCUMENTS

2004/0226001 A1* 11/2004 Teegan et al. ................. 717/120
2006/0291887 A1* 12/2006 Chen .............................. 399/75

FOREIGN PATENT DOCUMENTS

| | | | |
|---|---|---|---|
| JP | 02-090181 | | 3/1990 |
| JP | 2001-242967 | | 9/2001 |
| JP | 2005-092425 | | 4/2005 |
| JP | 2005-342964 | | 12/2005 |
| JP | 2006-079509 | | 3/2006 |
| JP | 2006072446 | A * | 3/2006 |
| JP | 2006-252212 | | 9/2006 |

OTHER PUBLICATIONS

Noda Tatsuo, "Power Saving Management Device", Mar. 23, 2006, Japanese Patent Publication 2006-079509.*

* cited by examiner

*Primary Examiner* — Nitin C Patel
(74) *Attorney, Agent, or Firm* — David G. Conlin; Steven M. Jensen; Edwards Angell Palmer & Dodge LLP

(57) ABSTRACT

A control unit 51 obtains a user ID of a user who enters a room from card reading information read by card readers so as to judge existence or nonexistence of an available image forming apparatus which has been judged in advance in accordance with the obtained user ID. The control unit selects the image forming apparatus with the highest frequency in use and turns on the power source thereof when the power source of any image forming apparatus is not made into an on state even when there are some image forming apparatuses which is available for the user who enters the room. Accordingly, it is possible to reduce power consumption by the image forming apparatus while improving convenience for a user in accordance with entrance and exit of the user.

35 Claims, 19 Drawing Sheets

FIG. 3

USER TABLE 521

| USER ID | NAME | AFFILIATION | ATTRIBUTION | E-mail ADD. |
|---|---|---|---|---|
| 100000 | ○×○× | □□×× | COMPANY MEMBER | A@×××.ne.jp |
| 100001 | △△×× | ○×△△ | COMPANY MEMBER | B@×××.ne.jp |
| 100002 | ×□△△ | ××○○ | COMPANY MEMBER | C@×××.ne.jp |
| 100003 | □□○○ | ○○×× | TEMP. EMPLOYEE | E@×××.ne.jp |
| ⋮ | ⋮ | ⋮ | ⋮ | ⋮ |

F I G. 4

AUTHORIZATION TABLE 522

| USER ID | AUTHENTICATION LEVEL | SYSTEM MANAGER | ROOM PERMITTED TO ENTER | AVAILABLE IMAGE FORMING APP. |
|---|---|---|---|---|
| 100000 | 1 | YES | 10,20,30 | 11,12,13,21,22,23,31,32,33 |
| 100001 | 2 | NO | 10,20 | 11,12,21,22 |
| 100002 | 2 | NO | 10,30 | 11,13,31,32 |
| 100003 | 3 | NO | 30 | 31 |
| ⋮ | ⋮ | ⋮ | ⋮ | ⋮ |

FIG. 5

ROOM TABLE

523

| ROOM ID | CARD READER ID | IMAGE FORMING APP. | POWER SOURCE MANAGEMENT FLAG |
|---|---|---|---|
| 10 | C01 | 11 | ON |
| | | 12 | ON |
| | | 13 | ON |
| ... | ... | ... | ... |

FIG. 6

STATE TABLE

524

| IMAGE FORMING APP. | POWER SOURCE STATE | OPERATING CONDITION |
|---|---|---|
| 11 | ON | NORMAL MODE |
| 12 | ON | POWER SAVING MODE (STANDBY MODE) |
| 13 | OFF | STOP MODE |
| 21 | ON | POWER SAVING MODE (STANDBY MODE) |
| ⋮ | ⋮ | ⋮ |

FIG. 7

ENTRANCE / EXITED STATE TABLE 525

| ROOM ID | ENTRANCE STATE | | LEAVING STATE | | PRESENT PERSON USER ID |
|---|---|---|---|---|---|
| | USER ID | TIME | USER ID | TIME | |
| 10 | 100000<br>100001<br>100002<br>⋮ | ××○○××<br>××○○○○<br>××○×○○<br>⋮ | 100001<br>100002<br>⋮ | ○○××○○<br>××○×××<br>⋮ | 100000<br>⋮ |
| ⋮ | ⋮ | ⋮ | ⋮ | ⋮ | ⋮ |

F I G. 8

USAGE HISTORY TABLE

526

| IMAGE FORMING APP. | USER ID | PROCESSING CONTENTS | NUMBER OF SHEETS | TIME |
|---|---|---|---|---|
| 11 | 100001 | COPY | 100 | ○×○○×× |
| | 100000 | PRINT | 50 | ××○×○○ |
| | 100002 | FAX TRANSMISSION | 20 | ○○×○×× |
| | 100001 | COPY | 80 | ×○××○○ |
| | ⋮ | ⋮ | ⋮ | ⋮ |
| ⋮ | ⋮ | ⋮ | ⋮ | ⋮ |

F I G. 10A

| USER \ IMAGE FORMING APP. | 11 | 12 | 13 |
|---|---|---|---|
| U1 | ○ | ○ | |
| | ON | ON | |

F I G. 10B

| USER \ IMAGE FORMING APP. | 11 | 12 | 13 |
|---|---|---|---|
| U1 | ○ | ○ | |
| U2 (ENTER) | ○ | | ○ |
| | ↓ KEPT ON | ↓ KEPT ON | ↓ NOT TURNED ON |

FIG. 12A

| USER \ IMAGE FORMING APP. | 11 | 12 | 13 |
|---|---|---|---|
| U3 | ◍ | ○ | |
| U4 | ○ | ○ | ○ |
| | ON | ON | |

FIG. 12B

| USER \ IMAGE FORMING APP. | 11 | 12 | 13 |
|---|---|---|---|
| U3 | ◍ | ○ | |
| U4 (LEAVE) | ◌ | ◌ | ◌ |
| | ↓ OFF | ↓ KEPT ON | ↓ OFF |

F I G. 1 4 A

| USER \ IMAGE FORMING APP. | 11 | 12 | 13 |
|---|---|---|---|
| U7 | ○ | ○ | |
| U8 | | ○ | ○ |

F I G. 1 4 B

| USER \ IMAGE FORMING APP. | 11 | 12 | 13 |
|---|---|---|---|
| U7 | ◍ | ○ | |
| U8 | | ○ | ○ |

↓ (11)
SHIFT TO POWER SAVING MODE

F I G. 15A

| USER \ IMAGE FORMING APP. | 11 | 12 | 13 |
|---|---|---|---|
| U5 | ○ | | |
| U6 | | ○ | ○ |

F I G. 15B

| USER \ IMAGE FORMING APP. | 11 | 12 | 13 |
|---|---|---|---|
| U5 | ◍ | | |
| U6 | | ○ | ○ |

↓ (under column 11)

NOT SHIFT TO POWER SAVING MODE

POWER SOURCE CONTROL METHOD OF IMAGE FORMING APPARATUS, POWER SOURCE CONTROL SYSTEM OF IMAGE FORMING APPARATUS, POWER SOURCE CONTROL APPARATUS, IMAGE FORMING APPARATUS AND COMPUTER PROGRAM PRODUCT

CROSS-REFERENCE TO RELATED APPLICATIONS

This Nonprovisional application claims priority under 35 U.S.C. §119(a) to Japanese Patent Application No. 2006-201106 filed in Japan on Jul. 24, 2006, the entire contents of which are hereby incorporated by reference.

BACKGROUND

1. Field of the Invention

The present invention relates to a power source control method of an image forming apparatus for controlling turn-on or turn-off of power sources of a plurality of image forming apparatuses, which is installed in a space where entrance and exit of a person is managed. In addition, the present invention relates to a power source control system of an image forming apparatus for realizing such a method. Further, the present invention relates to a power source control apparatus constituting such a power source control system, an image forming apparatus as a controlled object apparatus, and further, a computer program product for realizing the above-described power source control apparatus by a general-purpose computer system.

2. Description of Related Art

In recent years, with the speeding-up of information processing or the increase of amount of information represented by the Internet, a digital complex machine having a scanner function, a printer function, a facsimile function, and the like has been shared by many users in an office. On the other hand, request for security of the information held by each user and request for electric power saving to decrease electric power to be consumed in an office or the like have been increased.

Therefore, many authentication systems such as a user authentication when using a digital complex machine and a user authentication for entrance to and exit from a room where a digital complex machine is installed or the like have been proposed. Further, a method for reducing power consumption consumed by a digital complex machine is also proposed.

For example, in Japanese Patent Application Laid-Open No. 2005-342964, a network print system is proposed, which notifies to an entrance/exited management apparatus a user ID included in a print job when the print job for a network printer is issued and judges whether or not there is a user who instructed issuance of the print job in the room, carries out printing only when that user is in the room. According to such a system, it is possible to secure a high security.

In addition, in Japanese Patent Application Laid-Open No. 2005-92425, an image processing system is proposed, when an image processing apparatus installed in a room managed by an entrance/exited recording system is used, which allows operation from an operating unit when it is recorded that a user of a personal identification number which is inputted from the operating unit is present in the room. According to such a system, it is possible to intensify security by rejecting an operation by an unauthorized person.

In addition, in Japanese Patent Application Laid-Open No. 02-90181, a copying machine having an automatic power source off function for turning off a power source at a preset time is proposed, which prevents the automatic power source off function from being activated when an operator is present in a predetermined range around the copying machine. According to such a copying machine, the operator can carry out the copying operation immediately.

Conventionally, it has been generally carried out to turn off a power source of a digital complex machine installed in a room when the user is not present in the room while judging whether or not the user is present in a room by means of an entrance/exited management system.

However, according to an examples disclosed in Japanese Patent Application Laid-Opens No. 2005-342964 and No. 02-90181, although it is possible to improve security upon using of a digital complex machine by managing entrance and exit by means of a user ID or the like, it is not possible to reduce power consumption of the digital complex machine. In addition, according to an example disclosed in Japanese Patent Application Laid-Open No. 02-90181 and a conventional general example, the power source of the digital complex machine is not automatically turned on, so that it is necessary to manually turn on the power source of the digital complex machine whose power source has been turned off once. Therefore, the digital complex machine cannot be used till warming up is completed so as to make the complex machine available since turning on of the power source of the digital complex machine and this involves a problem such that there is no convenience for the user.

SUMMARY

The present invention has been made taking the foregoing circumstances into consideration and specifically, an object of which is to improve convenience for a user by turning on a power source of a controlled object apparatus (an image forming apparatus) immediately so as to cause the controlled object apparatus (image forming apparatus) to be available early since completion of warming up when the user enters a room where the controlled object apparatus (the image forming apparatus) is installed. In addition, another object of the present invention is to reduce power consumed by the controlled object apparatus (the image forming apparatus) when the user leaves the room.

In addition, another object of the present invention is to provide a power source control apparatus which can reduce power consumption more and improve convenience for a user more depending on the user who is present in a space (for example, in a room) the room by immediately turning on only a power source of a controlled object apparatus (an image forming apparatus) which is available for the user when the user enters the room and by turning off only the controlled object apparatus (an image forming apparatus) which is available for the user when the user leaves the room.

In addition, still another object of the present invention is to provide a power source control apparatus which can reduce power consumption more by turning on only a power source of a controlled object apparatus (an image forming apparatus) which is used by a user with the highest frequency in use when the user enters the room.

In addition, another object of the present invention is to provide a power source control apparatus which can reduce power consumption more by preventing a power source of another controlled object apparatus (an image forming apparatus) which is available for a user from being turned off when a power source of a controlled object apparatus (an image forming apparatus) available for the user who enters the room has been already turned on.

In addition, another object of the present invention is to provide a power source control apparatus, when the user is present in a space (in a room), which can improve convenience for the user who is present in the space while reducing power consumption by keeping the on state of a power source of at least one apparatus among controlled object apparatuses (image forming apparatuses) which is available for the user.

In addition, another object of the present invention is to provide a power source control apparatus which can reduce power consumption more without reducing convenience for a user by turning off a power source of a controlled object apparatus (an image forming apparatus) shifting to a power saving state, namely, a power source of a controlled object apparatus (an image forming apparatus) which has not been used for predetermined hours by the user who is present in a space.

In addition, another object of the present invention is to provide a power source control apparatus which can improve convenience for a user by preventing one apparatus among controlled object apparatuses (image forming apparatuses) available for the user who is present in a space from shifting to a power saving mode.

In addition, another object of the present invention is to provide a power source control apparatus which can reduce power consumption even in the case where a controlled object apparatus (an image forming apparatus) has no function for shifting to a power saving state by itself.

In addition, another object of the present invention is to provide a power source control apparatus which can warn a user against an unconsidered operation of a power source.

In addition, another object of the present invention is to provide a power source control apparatus which can warn a user against usage of a controlled object apparatus (an image forming apparatus) by a person who is not permitted to enter.

A power source control method of an image forming apparatus according to the present invention is a power source control method of an image forming apparatus for controlling, by a control apparatus, turn-on or turn-off of a power source that can be controlled from outside of each of one or plural image forming apparatus(es) installed in a predetermined space where an entrance/exit detecting apparatus for detecting entrance and exit of a person is provided. In addition, the first aspect of a power source control method of an image forming apparatus according to the present invention is characterized by comprising: by the control apparatus, obtaining from the entrance/exit detecting apparatus entrance/exit information indicating entrance and exit of a person into the predetermined space; and by the control apparatus, controlling turn-on or turn-off of a power source of the one or plural image forming apparatus(es) on the basis of the obtained entrance/exit information.

A power source control system of the image forming apparatus according to the present invention is a power source control system of an image forming apparatus including one or plural image forming apparatus(es) installed in a predetermined space and a power source control apparatus for controlling turn-on or turn-off of a power source of each of the one or plural image forming apparatus(es). In addition, the first aspect of a power source control system of the image forming apparatus according to the present invention is characterized in that entrance/exit detecting means for detecting entrance and exit of a person to and from the predetermined space is provided in the predetermined space; and the control apparatus comprises: entrance/exit information obtaining means for obtaining from the entrance/exit detecting means the entrance/exit information indicating entrance and exit of a person to and from the predetermined space; and controlling means for controlling turn-on or turn-off of a power source of each of the one or plural image forming apparatus(es) on the basis of the entrance/exit information obtained by the entrance/exit information obtaining means.

A power source control apparatus according to the present invention is a power source control apparatus for controlling turn-on or turn-off of a power source that can be controlled from the outside of each of one or plural controlled object apparatus(es) installed in a predetermined space where entrance/exit detecting means for detecting entrance and exit of a person is provided. In addition, the first aspect of a power source control apparatus according to the present invention is characterized by comprising: entrance/exit information obtaining means for obtaining from the entrance/exit detecting means entrance/exit information indicating entrance and exit of a person who enters to and exits from the predetermined space: and controlling means for controlling turn-on or turn-off of a power source of each of the one or plural controlled object apparatus(es) on the basis of the entrance/exit information obtained by the entrance/exit information obtaining means.

The second aspect of the power source control method of the image forming apparatus according to the present invention is characterized in that the control apparatus comprises a use authorization storing unit for storing identification information of a person and one or plural image forming apparatus (es) which is/are available for each person in relation to each other; and the method further comprises: by the control apparatus, obtaining from the obtained entrance/exit information the identification information for identifying a person who enters or leaves; when the identification information of a person who enters is obtained, by the control apparatus, turning on the power source of the image forming apparatus stored in the use authorization storing unit in relation to the obtained identification information; and when the identification information of a person who leaves is obtained, by the control apparatus, turning off the power source of the image forming apparatus stored in the use authorization storing unit in relation to the obtained identification information.

The second aspect of the power source control system of the image forming apparatus according to the present invention is characterized in that the control apparatus further comprising: use authorization storing means for storing the identification information of a person and one or plural image forming apparatus(es) which is available for each person in relation to each other; and identification information obtaining means for obtaining identification information for identifying a person who enters or leaves from the entrance/exit information obtained by the entrance/exit information obtaining means; and the controlling means turns on a power source of the image forming apparatus stored in the use authorization storing means in relation to the identification information obtained by the identification information obtaining means when the identification information obtaining means obtains the identification information of a person who enters, and turns off a power source of the image forming apparatus stored in the use authorization storing means in relation to the identification information obtained by the identification information obtaining means when the identification information obtaining means obtains the identification information of a person who leaves.

The second aspect of the power source control apparatus according to the present invention is characterized by further comprising: use authorization storing means for storing identification information of a person and one or plural controlled object apparatus(es) which is available for each person in relation to each other; and identification information obtaining means for obtaining from the entrance/exit information obtained by the entrance/exit information obtaining means identification information for identifying a person who enters or leaves; wherein the controlling means turns on a power source of the controlled object apparatus stored in the use authorization storing means in relation to the identification information obtained by the identification information obtaining means when the identification information obtaining means obtains the identification information of a person who enters, and turns off a power source of the controlled object apparatus stored in the use authorization storing means in relation to the identification information obtained by the identification information obtaining means when the identification information obtaining means obtains the identification information of a person who leaves.

The third aspect of the power source control method of the image forming apparatus according to the present invention is characterized in that the control apparatus further comprises a usage history storing unit for storing each usage history of the one or plural image forming apparatus(es) therein; and the method further comprises, when the identification information of a person who enters is obtained, by the control apparatus, turning on a power source of one apparatus among the image forming apparatuses stored in the use authorization storing unit in relation to the obtained identification information in accordance with the usage histories stored in the usage history storing unit.

The third aspect of the power source control system of the image forming apparatus according to the present invention is characterized in that the control apparatus further comprises usage history storing means for storing a usage history of each of the one or plural image forming apparatus(es); and when the identification information obtaining means obtains the identification information of the person who enters, the controlling means turns on a power source of one of the image forming apparatuses stored in the use authorization storing means in relation to the identification information obtained by the identification information obtaining means in accordance with the usage histories stored in the usage history storing means.

The third aspect of the power source control apparatus according to the present invention is characterized by further comprising: usage history storing means for storing a usage history of each of the one or plural controlled object apparatus (es); wherein, when the identification information obtaining means obtains the identification information of the person who enters, the controlling means turns on a power source of one apparatus among the controlled object apparatuses stored in the use authorization storing means in relation to the identification information obtained by the identification information obtaining means in accordance with the usage histories stored in the usage history storing means.

The fourth aspect of the power source control method of the image forming apparatus according to the present invention is characterized by further comprising: when the identification information of a person who enters is obtained, by the control apparatus, judging whether or not a power source of at least one apparatus among the image forming apparatuses stored in the use authorization storing unit in relation to the obtained identification information is turned on; and when it is judged that a power source of at least one apparatus is turned on, by the control apparatus, not turning on a power source of an image forming apparatus having a power source turned off among the image forming apparatuses stored in the use authorization storing unit in relation to the obtained identification information.

The fourth aspect of the power source control system of the image forming apparatus according to the present invention is characterized in that the control apparatus further comprises power source state judging means for judging whether a power source of each of the one or plural image forming apparatus(es) is turned on or turned off; and when the identification information obtaining means obtains the identification information of the person who enters, the controlling means makes the power source state judging means judge whether or not a power source of at least one apparatus among the image forming apparatuses stored in the use authorization storing means in relation to the identification information obtained by the identification information obtaining means is turned on; and when a power source of at least one apparatus is turned on, the controlling means does not turn on the power source of the image forming apparatus, whose power source is turned off, among the image forming apparatuses stored in the use authorization storing means in relation to the identification information obtained by the identification information obtaining means.

The fourth aspect of the power source control apparatus according to the present invention is characterized by further comprising power source state judging means for judging whether a power source of each of the one or plural controlled object apparatus(es) is turned on or turned off; wherein, when the identification information obtaining means obtains the identification information of the person who enters, the controlling means makes the power source state judging means judge whether a power source of at least one apparatus among the controlled object apparatuses stored in the use authorization storing means in relation to the identification information obtained by the identification information obtaining means is turned on or not; and when a power source of at least one apparatus is turned on, the controlling means does not turn on the power source of the controlled object apparatus whose power source is turned off among the controlled object apparatuses stored in the use authorization storing means in relation to the identification information obtained by the identification information obtaining means.

The fifth aspect of the power source control method of the image forming apparatus according to the present invention is characterized in that the control apparatus further comprises a present person identification information storing unit for storing the identification information of a person who is present in the predetermined space on the basis of a detection result of the entrance/exit detecting apparatus; and the method further comprises, when the identification information of the person who leaves is obtained, and there are the image forming apparatuses stored in the use authorization storing unit in relation to both of the obtained identification information of a person who leaves and the identification information stored in the present person identification information storing unit, not turning off a power source of at least one image forming apparatus among these apparatuses.

The fifth aspect of the power source control system of the image forming apparatus according to the present invention is characterized in that the control apparatus further comprises present person identification information storing means for storing identification information of a person who is present in the predetermined space on the basis of the detection result of the entrance/exit detecting means; and when the identification information obtaining means obtains the identification information of the person who leaves, and there are the image forming apparatuses stored in the use authorization storing means in relation to both of the identification information of the person who leaves obtained by the identification information obtaining means and the identification information stored in the present person identification information storing means, the control apparatus does not turn off a power source of at least one apparatus among them.

The fifth aspect of the power source control apparatus according to the present invention is characterized by further comprising present person identification information storing means for storing the identification information of a person who is present in the predetermined space on the basis of a detection result of the entrance/exit detecting means; wherein, when the identification information obtaining means obtains the identification information of the person who leaves, and there are controlled object apparatuses stored in the use authorization storing means in relation to both of the identification information of a person who leaves obtained by the identification information obtaining means and the identification information stored in the present person identification information storing means, the controlling means does not turn off a power source of at least one apparatus among these controlled object apparatus.

The sixth aspect of the power source control method of the image forming apparatus according to the present invention is characterized in that the control apparatus further comprises a stand-by information storing unit for storing stand-by information indicating that each of the one or plural image forming apparatus(es) is/are in a power saving state; and the method further comprises, when there are the image forming apparatuses stored in the use authorization storing unit in relation to both of the obtained identification information of a person who leaves and the identification information stored in the present person identification information storing unit, and there are the image forming apparatuses stored in the stand-by information storing unit among these apparatuses, by the control apparatus, turning off power sources of these apparatuses.

The sixth aspect of the power source control system of the image forming apparatus according to the present invention is characterized in that the control apparatus further comprises stand-by information storing means for storing stand-by information indicating that each of the one or plural image forming apparatus(es) is/are in a power saving state; and when there are image forming apparatuses stored in the use authorization storing means in relation to both of the identification information of the person who leaves obtained by the identification information obtaining means and the identification information stored in the present person identification information storing means, and there are the image forming apparatuses whose stand-by information is stored in the stand-by information storing means among them, the control apparatus turns off power sources of these apparatuses.

The sixth aspect of the power source control apparatus according to the present invention is characterized by further comprising stand-by information storing means for storing stand-by information indicating that each of the one or plural controlled object apparatus(es) is made into a power saving state; wherein, when there are controlled object apparatuses stored in the use authorization storing means in relation to both of the identification information of a person who leaves obtained by the identification information obtaining means and the identification information stored in the present person identification information storing means, and there are the controlled object apparatuses whose stand-by information is stored in the stand-by information storing means among them, the controlling means turns off a power source of these apparatuses.

The seventh aspect of the power source control method of the image forming apparatus according to the present invention is characterized by further comprising: by the control apparatus, obtaining from each image forming apparatus shift information indicating that each of the one or plural image forming apparatus(es) is/are shifted into a power saving state when they have not been used for a predetermined time; when the shift information is obtained from one image forming apparatus among the one or plural image forming apparatus (es), by the control apparatus, judging existence or nonexistence of an image forming apparatus not in a power saving state other than the one image forming apparatus among the image forming apparatuses stored in the use authorization storing unit in relation to the identification information stored in the present person identification information storing unit; and when the result of judgment shows there is no image forming apparatus satisfying a condition, by the control apparatus, outputting a shift prohibiting signal for prohibiting the one image forming apparatus from being shifted into a power saving state.

The seventh aspect of the power source control system of the image forming apparatus according to the present invention is characterized in that the control apparatus further comprises: shift information obtaining means for obtaining shift information indicating that each of the one or plural image forming apparatus(es) is/are shifted into a power saving state from each of them when they have not been used for a predetermined time; power saving state judging means for, when the shift information obtaining means obtains the shift information from one image forming apparatus among the one or plural image forming apparatus(es), judging existence and nonexistence of an image forming apparatus not in a power saving state other than the one image forming apparatus among the image forming apparatuses stored in the use authorization storing means in relation to the identification information stored in the present person identification information storing means; and power saving state shift prohibiting signal outputting means for, when the power saving state judging means judges that there is no image forming apparatus satisfying a condition, outputting a shift prohibiting signal in order to prohibit the one image forming apparatus from being made into a power saving state.

The seventh aspect of the power source control apparatus according to the present invention is characterized by further comprising: shift information obtaining means for obtaining shift information indicating that each of the one or plural controlled object apparatus(es) is shifted into a power saving state from each of them when they have not been used for a predetermined time; power saving state judging means for, when the shift information obtaining means obtains the shift information from one controlled object apparatus among the one or plural controlled object apparatus(es), judging existence and nonexistence of a controlled object apparatus not in a power saving state other than the one controlled object apparatus among the controlled object apparatuses stored in the use authorization storing means in relation to the identification information stored in the present person identification information storing means; and power saving state shift prohibiting signal outputting means for, when the power saving state judging means judges that there is no controlled object apparatus satisfying a condition, outputting a shift prohibiting signal in order to prohibit the one controlled object apparatus from being made into a power saving state.

The eighth aspect of the power source control method of the image forming apparatus according to the present invention is characterized by further comprising: by the control apparatus, judging whether or not each of the one or plural image forming apparatus(es) has/have not been used for a predetermined time; and by the control apparatus, outputting a shift signal for shifting the one or plural image forming apparatus(es), which is/are judged not to be used for a predetermined time by the judgment, into the power saving state.

The eighth aspect of the power source control system of the image forming apparatus according to the present invention is characterized in that the control apparatus further comprises: use state judging means for judging whether or not the each of one or plural image forming apparatus(es) has/have not been used for a predetermined time; and power saving shift signal outputting means for outputting a sift signal in order to shift one or plural image forming apparatus(es) which is/are judged by the use state judging means not to be used for a predetermined time into a power saving state.

The eighth aspect of the power source control apparatus according to the present invention is characterized by further comprising: use state judging means for judging whether or not the each of one or plural controlled object apparatus(es) has/have not been used for a predetermined time; and power saving shift signal outputting means for outputting a shift signal in order to shift one or plural controlled object apparatus(es) which is/are judged not to be used for a predetermined time into a power saving state by the use state judging means.

The ninth aspect of the power source control method of the image forming apparatus according to the present invention is characterized by further comprising: by the control apparatus, obtaining from each image forming apparatus operation information indicating that a power source of each of the one or plural image forming apparatus(es) is turned on or turned off; and when the operation information indicating that the power source is turned off is obtained from the image forming apparatus whose power source is turned on by the control apparatus, or the operation information indicating that the power source is turned on is obtained from the image forming apparatus whose power source is turned off by the control apparatus, by the control apparatus, outputting a warning.

The ninth aspect of the power source control system of the image forming apparatus according to the present invention is characterized in that the control apparatus further comprises: operation information obtaining means for obtaining operation information indicating that a power source of each of the one or plural image forming apparatus(es) is/are turning on or turning off from each image forming apparatus; and means for outputting a warning when the operation information indicating that a power source is turned off is obtained from the image forming apparatus whose power source is turned on by the controlling means, or when the operation information indicating that a power source is turned on is obtained from the image forming apparatus whose power source is turned off by the controlling means.

The ninth aspect of the power source control apparatus according to the present invention is characterized by further comprising: operation information obtaining means for obtaining operation information indicating that a power source of each of the one or plural controlled object apparatus (es) is turned on or turned off from each controlled object apparatus; and means for outputting a warning when the operation information indicating that a power source is turned off is obtained from the controlled object apparatus whose power source is turned on by the controlling means, or when the operation information indicating that a power source is turned on is obtained from the controlled object apparatus whose power source is turned off by the controlling means.

The tenth aspect of the power source control method of the image forming apparatus according to the present invention is characterized in that the one or plural image forming apparatus(es) has/have a function for accepting the identification information of a person who can use each of them; and the method further comprising: by the control apparatus, obtaining the identification information of the person who can use each of the one or plural image forming apparatus(es) from the one or plural image forming apparatus(es); by the control apparatus, judging whether or not the obtained identification information and the identification information stored in the present person identification information storing unit coincide with each other; and when the judgment results show they do not coincide with each other, by the control apparatus, outputting a warning.

The tenth aspect of the power source control system of the image forming apparatus according to the present invention is characterized in that the one or plural image forming apparatus(es) has/have a function for accepting the identification information of a person who can use each of them; and the power source control system further comprises: use permission information obtaining means for obtaining the identification information of a person who can use each of the one or plural image forming apparatus(es) from them; judging means for judging whether the identification information obtained by the use permission information obtaining means and the identification information stored in the present person identification information storing means coincide with each other; and means for outputting a warning in the case where the judgment results by the judging means do not coincide with each other.

The tenth aspect of the power source control apparatus according to the present invention is characterized in that the one or plural controlled object apparatus(es) has/have a function for accepting the identification information of a person who can use each of them; and the power source control apparatus further comprises: use permission information obtaining means for obtaining the identification information of a person who can use each of the one or plural controlled object apparatus(es) from them; judging means for judging whether the identification information obtained by the use permission information obtaining means and the identification information stored in the present person identification information storing means coincide with each other; and means for outputting a warning when the judgment results by the judging means do not coincide with each other.

An image forming apparatus according to the present invention is an image forming apparatus installed in a predetermined space where entrance/exit detecting means for detecting entrance and exit of a person is provided. In addition, one aspect of the image forming apparatus according to the present invention is characterized by comprising: switching means for switching turn-on or turn-off of a power source on the basis of the entrance/exit information, obtained by the entrance/exit detecting means, indicating entrance and exit of the person to and from the predetermined space.

Another aspect of the image forming apparatus according to the present invention is characterized in that the identification information for identifying the person who can use the apparatus has been judged in advance, when the identification information for identifying the person who enters obtained from the entrance/exit information coincides with the identification information which has been judged in advance, the switching means turns on a power source, and when the identification information for identifying the person who leaves obtained from the entrance/exit information coincides with the identification information which has been judged in advance, the switching means turns off a power source.

Still another aspect of the image forming apparatus according to the present invention is characterized in that the image forming apparatus has a function for accepting the identification information of the person who can use each image forming apparatus; and the image forming apparatus further comprises means for outputting a warning when the identification information for identifying the person who enters obtained by the entrance/exit information does not coincide with the accepted identification information.

A computer program product according to the present invention is characterized by realizing such power source control apparatus according to the present invention.

According to the first aspect, when the entrance/exit information indicating entrance and exit of a person (for example, entrance to and exit from a room) is obtained, depending on the obtained entrance/exit information, turn-on or turn-off of a power source of a controlled object apparatus (an image forming apparatus) installed in a space (for example, in a room) of which entrance and exit are managed.

According to such first aspect, for example, when a user enters (for example, enters a room), since the power source of the controlled object apparatus (the image forming apparatus) is immediately turned on, the image forming apparatus is caused to be available early since completion of warming up. Thereby, the user can carry out the first processing (for example, copying, printing or the like) earlier so as to improve convenience for the user. In addition, when the user leaves (for example, leaves the room), the power source of the controlled object apparatus (the image forming apparatus) is turned off, so that the power to be consumed by the controlled object apparatus (the image forming apparatus) can be reduced.

In addition, according to the second aspect, when the identification information of a person who enters is obtained, the power source of the controlled object apparatus (the image forming apparatus) in relation to the obtained identification information is turned on. In addition, when the identification information of a person who leaves is obtained, the power source of the controlled object apparatus (the image forming apparatus) in relation to the obtained identification information is turned off. For example, when a user enters, only the power source of the controlled object apparatus (the image forming apparatus) available for the user who enters is immediately turned on, however, the power source of the controlled object apparatus (the image forming apparatus) unavailable for the user who enters is not turned on. In addition, when a user leaves, only the power source of the controlled object apparatus (the image forming apparatus) available for the user who leaves is turned off, however, the power source of the controlled object apparatus (the image forming apparatus) unavailable for the user who leaves is not turned off.

According to such second aspect, depending on the user who is present (for example, present in the room), power consumption of the image forming apparatus (the controlled object apparatus) can be reduced more and convenience for the user can be improved more.

Further, according to the third aspect, when the identification information of a person who enters is obtained, depending on the stored usage history, a power source of one controlled object apparatus among the controlled object apparatuses (the image forming apparatuses) in relation to the obtained identification information is turned on. For example, one controlled object apparatus which is used by the user with the highest frequency in use among the controlled object apparatuses (the image forming apparatuses) in relation to the obtained identification information is selected and only the power source of the selected controlled object apparatus (the image forming apparatus) is turned on.

According to such third aspect, it is prevented that the power source of the controlled object apparatus (the image forming apparatus) which is used by the user with a low frequency is also turned on, so that increase in power consumption due to turning on of the power sources of many controlled object apparatuses (the image forming apparatuses) is prevented and power consumption can be reduced more.

Further, according to the fourth aspect, when the identification information of a person who enters is obtained, when it is judged that the power source of at least one controlled object apparatus among the controlled object apparatuses (the image forming apparatuses) in relation to the obtained identification information is turned on, the power source of the controlled object apparatus (the image forming apparatus) whose power source is turned off among the controlled object apparatuses (the image forming apparatuses) in relation to the obtained identification information is not turned on.

According to such fourth aspect, for example, in the case where the power source of the controlled object apparatus (the image forming apparatus) which is available for the user who enters has been already turned on, the power consumption can be reduced more by preventing the user from turning on the power source of another available controlled object apparatus (the image forming apparatus). In addition, since the power source of the controlled object apparatus (the image forming apparatus) which is available for the user who enters has been already turned on, convenience for the user is not reduced.

Further, according to the fifth aspect, when the identification information of a person who leaves is obtained, if there are the controlled object apparatuses (the image forming apparatuses) in relation to both of the obtained identification information and the identification information of a person who enters (for example, a person who enters the room), the power source of at least one controlled object apparatus among these controlled object apparatuses (these image forming apparatuses) is not turned off.

According to such fifth aspect, for example, in the case where the controlled object apparatus (the image forming apparatus) which is available for a user who leaves is also available for a user who is present, there is a probability that the user who is present uses that controlled object apparatus (that image forming apparatus), so that a power source of at least one apparatus among the controlled object apparatuses (the image forming apparatuses) is kept at the on state. Thereby, convenience for the user who is present is improved while reducing power consumption.

In addition, according to the sixth aspect, the power source of the controlled object apparatus (the image forming apparatus) whose stand-by information indicating the power saving state is obtained is turned off among the controlled object apparatuses (the image forming apparatuses) in relation to both of the identification information of a person who leaves and that of a person who is present.

According to such sixth aspect, since the power source of the controlled object apparatus (the image forming apparatus) shifted to the power saving state, namely, the power source of the controlled object apparatus (the image forming apparatus) which the user who is present has not used for a predetermined time is turned off, so that it is possible to reduce power consumption more without reducing convenience for the user.

Further, according to the seventh aspect, in the case where shift information indicating that the apparatus shifts to the power saving state is obtained from one controlled object apparatus (one image forming apparatus), it is judged whether or not there is another controlled object apparatus (another image forming apparatus) which is not in the power saving state among the controlled object apparatuses in relation to the identification information of a person who is present. When it is judged that there is no other controlled object apparatus (image forming apparatus) which is not in the power saving state, a shift prohibiting signal for prohibiting the above-described one controlled object apparatus (one image forming apparatus) from being shifted into the power saving state is outputted.

According to such seventh aspect, since one apparatus among the controlled object apparatuses (the image forming apparatuses) which is available for the user who is present is not shifted into the power saving state but is in the state that the apparatus can be immediately used (for example, a normal state), so that convenience for the user can be improved.

In addition, according to the eighth aspect, in the case where it is judged that the controlled object apparatus (the image forming apparatus) has not been used for a predetermined time, a shift signal for shifting the controlled object apparatus (that image forming apparatus) into the power saving state is outputted. For example, in the case where the controlled object apparatus (the image forming apparatus) has not been used for a predetermined time including the case where usage start information indicating that the controlled object apparatus (the image forming apparatus) is used is not obtained even after a predetermined time has passed from a point of time when the power source of the controlled object apparatus (the image forming apparatus) is turned on or the case where usage start information indicating that the controlled object apparatus (the image forming apparatus) is used is not obtained even after a predetermined time has passed from a point of time when usage stop information is obtained due to termination of the operation of the controlled object apparatus (the image forming apparatus) (for example, an image forming job), the controlled object apparatus (the image forming apparatus) is shifted into the power saving state.

According to such eighth aspect, even when the controlled object apparatus (the image forming apparatus) has no function to shift to the power saving state by itself, that apparatus is shifted into the power saving state by compulsion and this makes it possible to reduce power consumption.

Further, according to the ninth aspect, when operation information indicating that the power source is turned off (or is turned on) is obtained from the controlled object apparatus (the image forming apparatus), a warning is outputted.

According to such ninth aspect, when the unconsidered operation of the power source is carried out, the warning can be outputted about the unconsidered operation.

In addition, further, according to the tenth aspect, the identification information is obtained from the controlled object apparatus (the image forming apparatus) having a function for accepting the identification information for identifying availability of usage, and then, it is judged whether or not the obtained identification information coincides with the identification information of a person who is present. When it is judged that the obtained identification information does not coincide with the identification information, a warning is outputted.

According to such tenth aspect, it is possible to warn against an improper usage of the controlled object apparatus (the image forming apparatus) by a person who is not permitted to enter the room.

The above and further objects and features of the invention will more fully be apparent from the following detailed description with accompanying drawings.

BRIEF DESCRIPTION OF THE SEVERAL VIEWS OF THE DRAWINGS

FIG. 3 is an explanatory view showing a record layout of a user table;

FIG. 4 is an explanatory view showing a record layout of an authorization table;

FIG. 5 is an explanatory view showing a record layout of a room table;

FIG. 6 is an explanatory view showing a record layout of a state table;

FIG. 7 is an explanatory view showing a record layout of an entrance/exited state table;

FIG. 8 is an explanatory view showing a record layout of a usage history table;

FIG. 10A and FIG. 10B are explanatory views showing a specific example of power source turning on control;

FIG. 12A and FIG. 12B are explanatory views showing a specific example of power source off control;

FIG. 14A and FIG. 14B are explanatory views showing an example of power saving mode shifting control of the image forming apparatus;

FIG. 15A and FIG. 15B are explanatory views showing an example of power saving mode shifting control of the image forming apparatus;

DETAILED DESCRIPTION

Hereinafter, the present invention will be described below with reference to the drawings for illustrating the embodiments thereof.

Figure 1:
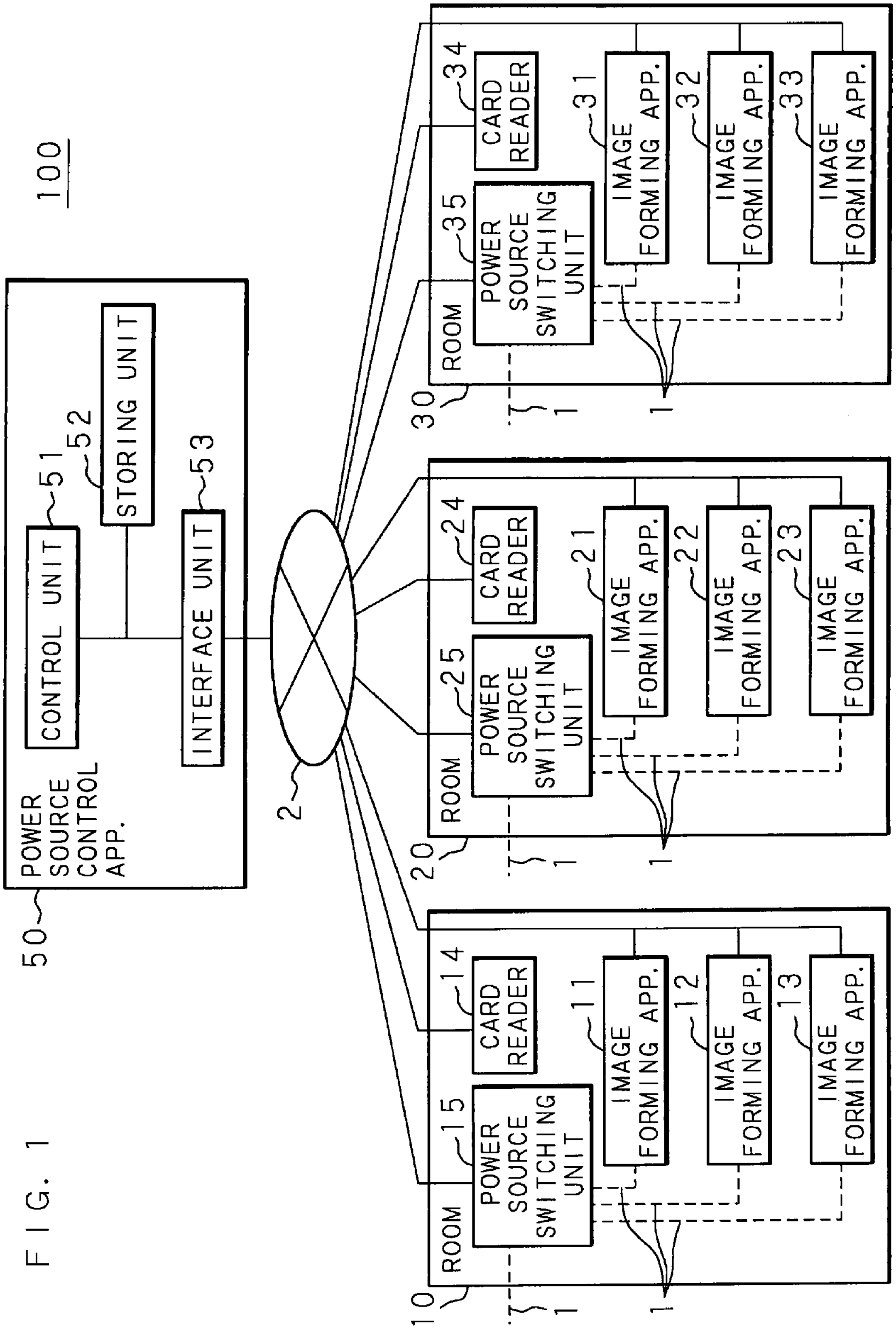
FIG. 1 is a block diagram showing a configuration of a power source control system of an image forming apparatus according to the present invention.

FIG. 1 is a block diagram showing a configuration of a power source control system 100 of an image forming apparatus (for example, a digital complex machine) according to the present invention. As shown in FIG. 1, the power source control system 100 includes image forming apparatuses 11, 12 and 13 installed in a room 10, image forming apparatuses 21, 22 and 23 installed in a room 20, and image forming apparatuses 31, 32 and 33 installed in a room 30 among the rooms 10, 20 and 30 of which entrance and exit are managed; and a power source control apparatus 50 for controlling turn-on or turn-off of each power source of the image forming apparatuses 11, 12, 13, 21, 22, 23, 31, 32 and 33 installed in respective rooms 10, 20, and 30, and the like. Note that the number of the rooms and the number of the image forming apparatuses are judged as an example and these numbers are not limited to this.

In the room 10, a power source switching unit 15 for turning on or turning off each power source of the image forming apparatuses 11, 12 and 13 and a card reader 14 for reading a user ID which is recorded in an IC card possessed by a user when the user enters and leaves the room are installed. The image forming apparatuses 11, 12 and 13, the power source switching unit 15, and the card reader 14 are connected to the power source control apparatus 50 via a communication network 2 such as a LAN.

In addition, in the room 20, a power source switching unit 25 for turning on or turning off each power source of the image forming apparatuses 21, 22 and 23 and a card reader 24 for reading a user ID which is recorded in an IC card possessed by a user when the user enters and leaves the room are installed. The image forming apparatuses 21, 22 and 23, the power source switching unit 25, and the card reader 24 are connected to the power source control apparatus 50 via the communication network 2.

Further, in the room 30, a power source switching unit 35 for turning on or turning off each power source of the image forming apparatuses 31, 32 and 33 and a card reader 34 for reading a user ID which is recorded in an IC card possessed by a user when the user enters and leaves the room are installed. The image forming apparatuses 31, 32 and 33, the power source switching unit 35, and the card reader 34 are connected to the power source control apparatus 50 via the communication network 2.

The card reader 14 has a storing unit (not illustrated) for storing a card reader ID for identifying a card reader itself, and card reading units (not illustrated) which are located on each of outside and inside of the room 10, and the like. When a user enters the room, by reading the IC card possessed by the user by the card reader located on the outside of the room, the card reader 14 transmits card reading information including the read user ID, the information indicating that the card reader located on the outside of the room has read the user ID, and the card reader ID of the card reader 14 itself, and the like to the power source control apparatus 50 via the communication network 2.

On the contrary, when the user leaves the room, by reading the IC card possessed by the user by the card reader located on the inside of the room, the card reader 14 transmits the card reading information including the read user ID, the information indicating that the card reader located on the inside of the room has read the user ID, and the card reader ID of the card reader 14 itself, and the like to the power source control apparatus 50 via the communication network 2. In addition, respective rooms 10, 20 and 30 are provided with a door locking device (not illustrated) to be locked so that only the user who is permitted to enter the room can enter the room when the user ID read by the card readers 14, 24 and 34 is authenticated by the power source control apparatus 50. Further, since the card readers 24 and 34 also have the same configurations as the above-described card reader 14, the explanation thereof is omitted herein.

The power source switching unit 15 is provided with an electromagnetic relay (not illustrated) for turning on and turning off a power source (for example, a commercial power source) connected to the image forming apparatuses 11, 12 and 13 via power source wires 1, and the like, so as to individually switch power source wires 1, 1 and 1 which are connected to each of the image forming apparatuses 11, 12 and 13 depending on a power source on signal or a power source off signal transmitted from the power source control apparatus 50. Further, since the power source switching units 25 and 35 also have the same configurations as the above-described power source switching unit 15, the explanation thereof is omitted herein.

Figure 2:
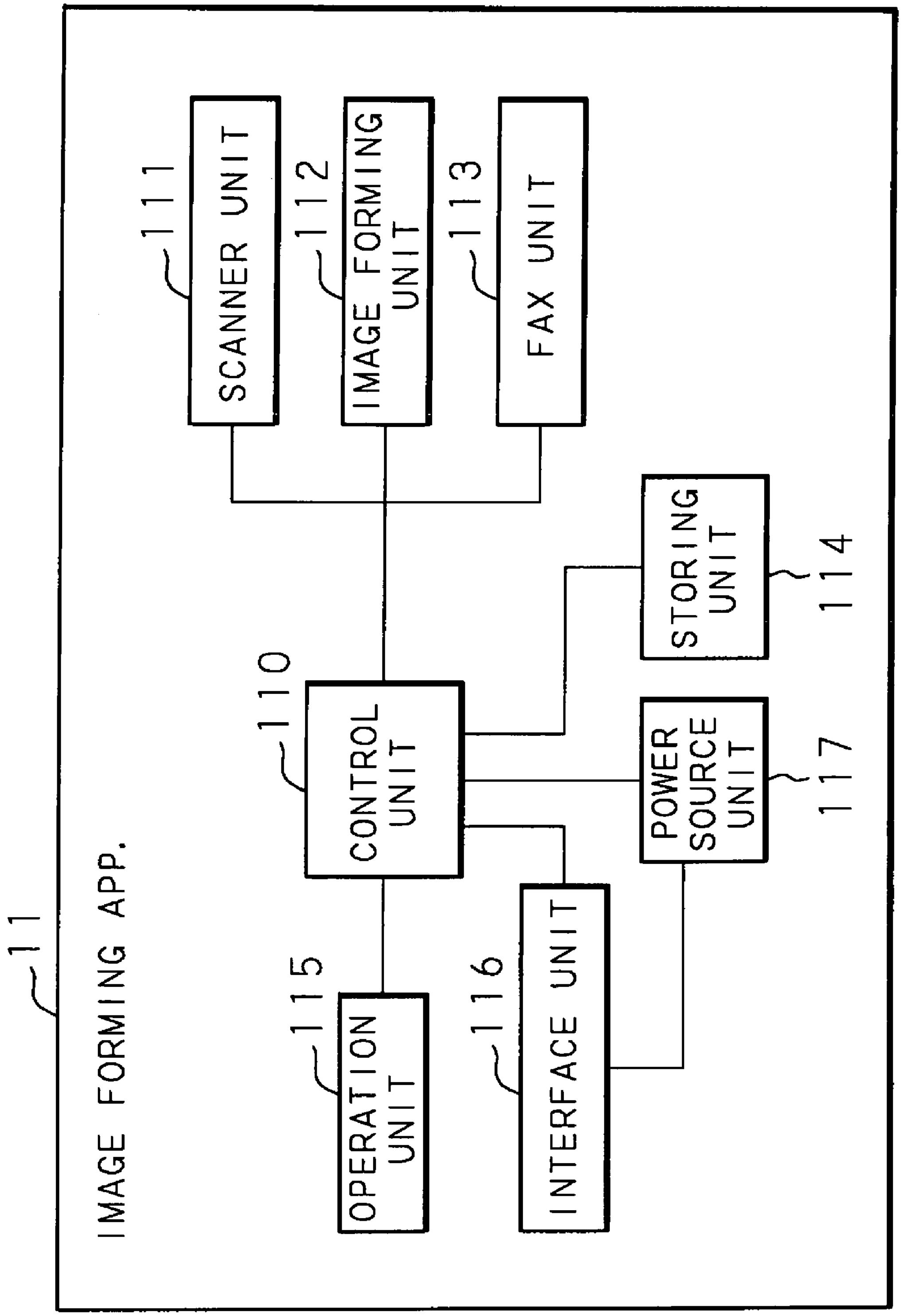
FIG. 2 is a block diagram showing a configuration of the image forming apparatus.

FIG. 2 is a block diagram showing a configuration of the image forming apparatus 11. The image forming apparatus 11 is provided with a scanner unit 111, an image forming unit 112, a FAX unit 113, a storing unit 114, an operation unit 115, an interface unit 116, a power source unit 117, and a control unit 110 for controlling these respective units, and the like.

The scanner unit 111 is provided with a document conveying unit, a CCD, and a document sensor (all of them are not illustrated). The scanner unit 111 detects the document conveyed to a predetermined position with the document sensor and irradiates a light to the document moving on a conveying path for conveying the document. Then, photoelectrically converting a reflection light from the document by a CCD, the scanner unit 111 converts it into an analog signal and then, converting the obtained analog signal into a digital signal, the scanner unit 111 outputs it to the control unit 110. Thus, the document is read by the scanner unit 111, and the image data is obtained.

The control unit 110 stores the image data outputted from the scanner unit 111 in the storing unit 114. In addition, on the basis of the stored image data, the control unit 110 reads the image data stored in the storing unit 114 in the case of carrying out image forming or FAX transmission and then, the control unit 110 outputs the image data to the image forming unit 112 or the FAX unit 113.

The image forming unit 112 forms an image on a paper by printing or copying the image data which is stored in the storing unit 114. For example, the image forming unit 112 is provided with a charger for charging a photosensitive drum at a predetermined potential, a laser writing unit for forming an electrostatic latent image on a surface of the photosensitive drum, a developing unit for feeding toner to the electrostatic latent image formed on the surface of the photosensitive drum and developing it into a microscope image, and a transfer unit for transferring a toner image on the surface of the photosensitive drum on the paper, and the like (all of them are not illustrated). The image forming unit 112 is not limited to an electro-photographic type but it may be a type such as an ink jet type, a thermal transfer type, or the like.

The FAX unit 113 is provided with a facsimile communication interface for establishing a facsimile communication with a facsimile apparatus (not illustrated) connected to a telephone line network (not illustrated), to which the image forming apparatus 11 is connected, and the FAX unit 113 transmits the image data stored in the storing unit 114 to the facsimile apparatus.

For example, the operation unit 115 is an operation panel of a touch panel system and the operation unit 115 is provided with an input unit for accepting an operation instruction by the user and a display unit using a liquid crystal display for displaying the information to be informed to the user, and the like. For example, in the case where the user uses the image forming apparatus 11, when the user inputs a user ID (or a pass word) from the operation unit 115, the authentication processing of the user ID is carried out. As a result, only for the user who is permitted to use the image forming apparatus 11 can use the image forming apparatus 11 (for example, printing processing, copying processing, FAX transmission processing, or the like).

The interface unit 116 is provided with an interface for carrying out communication with the power source control apparatus 50 connected to the communication network 2, to which the image forming apparatus 11 is connected, or an external personal computer (not illustrated), or the like. The interface unit 116 transmits the state of the power source, the operating condition, and various information of the image forming apparatus 11 to the power source control apparatus 50 and receives various control signals from the power source control apparatus 50. In addition, the interface unit 116 receives the image data from the external personal computer (not illustrated) and accepts a processing request the printing processing, the copying processing, or the like.

The power source unit 117 is provided with an internal power source (not illustrated) for outputting a predetermined voltage to each unit of the image forming apparatus 11 and controls power feeding to each unit of the image forming apparatus 11 by means of the control unit 110. Specifically, the power source unit 117 turns on and turns off the internal power source depending on each mode such as a normal mode (a normal state) for feeding power to the entire image forming apparatus 11, a power saving mode (a power saving state) for reducing power consumption by feeding power only to a part of the image forming apparatus 11, and a stop mode (a stop state) for stopping power feeding to the entire image forming apparatus 11. For example, in the power saving mode (a standby mode), by turning off power feeding to the scanner unit 111, the image forming unit 112, the FAX unit 113, the operation unit 115,and the like, the power source unit 117 reduces the power to be consumed by the image forming apparatus 11.

The control unit 110 is constituted by a CPU or the like so as to control the entire processing of the image forming apparatus 11. The control unit 110 controls the reading processing, the printing processing, and the copying processing of the document, the FAX transmission processing, the storage processing of the image data, the filing processing, or the like depending on a processing request inputted through the operation unit 115, the interface unit 116, or the like.

In addition, the control unit 110 transmits the user ID (or the pass word) inputted from the operation unit 115 to the power source control apparatus 50 and in accordance with this, the control unit 110 receives a result of the user authentication processing which has been carried out by the power source control apparatus 50. When it is judged (authenticated) that this user ID is a registered one, the control unit 110 permits using of the image forming apparatus 11 by the user and accepts the operation by the user for the operation unit 115. On the other hand, when it is judged that this user ID is not a registered one, the control unit 110 displays a warning so as to prohibit using of the image forming apparatus 11 by the user and not accept the operation by the user for the operation unit 115.

In addition, the control unit 110 transmits, to the power source control apparatus 50, the power source on information or the power source off information indicating what state the power source of the image forming apparatus 11 is made into, and the normal mode information, the power saving mode information, or the stop mode information indicating what state the operating condition is made into. The power source on information indicates the state that the power source of the image forming apparatus 11 is turned on (power on) and the power source off information indicates the state that the power source of the image forming apparatus 11 is turned off (cut off). In addition, the normal mode information indicates the state that a predetermined voltage is fed to each unit of the image forming apparatus 11, namely, the state that the user can immediately use the image forming apparatus 11. The power saving mode information indicates the state that a predetermined voltage is fed only to a part of the image forming apparatus 11, namely, the power saving state (the standby state). The stop mode information indicates the state that a predetermined voltage is not fed to each unit of the image forming apparatus 11, namely, the power source off state.

In addition, the control unit 110 transmits usage start information indicating that the image forming apparatus 11 is started to be used by the user in the case of carrying out, for example, the printing processing, the copying processing, the FAX transmission processing or the like when a processing request (a job request) is inputted from the operation unit 115, the interface unit 116, or the like. In addition, the control unit 110 transmits usage stop information indicating the state waiting for a next processing request (a job request) to the power source control apparatus 50 when the requested processing is terminated.

In addition, the control unit 110 transmits, to the power source control apparatus 50, shift start information indicating that the image forming apparatus 11 is shifted from the normal mode into the power saving mode when the image forming apparatus 11 is not started to be used even if a predetermined time (for example, three or five minutes) has passed after the power source of the image forming apparatus 11 is turned on or when the image forming apparatus 11 is not started to be used even if a predetermined time has passed after a job is terminated. In accordance with this, when a shift prohibiting signal for prohibiting shift to the power saving mode is not received from the power source control apparatus 50, the control unit 110 outputs a control signal to the power source unit 117 so as to be shifted into a power saving mode. In addition, the control unit 110 is shifted from the power saving mode into the normal mode when the processing request (the job request) is made by the user after being shifted into the power saving mode.

Since all of the image forming apparatuses 12, 13, 21, 22, 23, 31, 32 and 33 have the same configurations as that of the image forming apparatus 11, so that explanations thereof are omitted herein.

The power source control apparatus 50 is provided with a control unit 51 for controlling the entire power source control apparatus 50, a storing unit 52 using an HDD or the like, and an interface unit 53 for carrying out a communication between the image forming apparatuses 11, 12, 13, 21, 22, 23, 31, 32 and 33, the card readers 14, 24 and 34, and the power source switching units 15, 25 and 35. In addition, it is possible to connect an input apparatus (for example, a key board, a mouse) for operating the power source control apparatus 50, and an output apparatus (for example, a display) for outputting a result or the like which is processed by the power source control apparatus 50 to the power source control apparatus 50.

The control unit 51 is constituted by, for example, a CPU, a RAM, and the like, and the control unit 51 controls the operation of the power source control apparatus 50 in accordance with a control procedure indicated by a control program by loading a control program stored in the storing unit 52 to a RAM and carrying out this control program by a CPU. For example, the control unit 51 carries out respective processing such as the authentication processing of the user who enters respective rooms 10, 20 and 30; power source turning on control processing or a power source turning off control processing for controlling turning on/off of the power sources of respective image forming apparatuses 11, 12, 13, 21, 22, 23, 31, 32 and 33; a power saving mode shift control processing for controlling if respective image forming apparatuses 11, 12, 13, 21, 22, 23, 31, 32, and 33 should be shifted into a power saving mode or not; a power source state monitoring processing for monitoring the states of the power sources of respective image forming apparatuses 11, 12, 13, 21, 22, 23, 31, 32 and 33; a using monitoring processing for monitoring using (access) of respective image forming apparatuses 11, 12, 13, 21, 22, 23, 31, 32 and 33, and the like. Further, the details of respective processing will be described later.

The storing unit 52 stores a user table 521 showing the information of each user, an authorization table 522 showing an authorization of each user, a room table 523 showing information of each room, a state table 524 showing the state of each image forming apparatus, an entrance/exited state table 525 showing an entrance and exist state of the user, a usage history table 526 showing a usage history of each image forming apparatus, and the like therein in addition to the above-described control program.

FIG. 3 is an explanatory view showing a record layout of the user table 521. The user table 521 records the individual information of each user and the user table 521 is constituted by data items such as a user ID, a name of the user, affiliation of the user, attribution of the user (a company member, a part-timer, a temporary employee, or the like), an E-mail address of the user, and the like. Further, in the user table 521, a system manager or the like can perform the processing such as creation, updating, and deletion in accordance with change of the user.

FIG. 4 is an explanatory view showing a record layout of the authorization table 522. The authorization table 522 records the information in relation to the authorization of each user and the authorization table 522 is constituted by data items such as a user ID, a level of a user authentication, whether or not the user is a system manager, room information that the user is permitted to enter a room (the user can enter the room), image forming apparatus information that the user is permitted to use the apparatus (the user can use the apparatus), and the like. For example, a user whose user ID is "100000" has an authorization level "1" (for example, "1" is the highest authorization level), this user is a system manager, this user is permitted to enter all of the rooms 10, 20, and 30, and this user is permitted to use all image forming apparatuses 11, 12, 13, 21, 22, 23, 31, 32 and 33. In addition, the user whose user ID is "100001" has the authorization level "2", this user is not a system manager, this user can enter the rooms "10" and "20", and this user is limited to the image forming apparatuses "11", "12", "21" and "22" which is available for this user. Further, in the authorization table 522, the system manager or the like can perform the processing such as creation, updating, and deletion in accordance with change of the user.

FIG. 5 is an explanatory view showing a record layout of the room table 523. The room table 523 records the information in relation to each room and the room table 523 is constituted by data items such as a room ID, the card reader ID for identifying a card reader installed in each room, image forming apparatuses installed in each room, a power source management flag showing if each image forming apparatus is set so that its power source is controlled by the power source control apparatus 50, or not, and the like. For example, in the room having the room ID "10", the card reader 14 whose ID is "C01" is installed, and the image forming apparatuses 11, 12, and 13 are installed. All of the power source management flags of the image forming apparatuses 11, 12 and 13 are "ON", so that control of turning on and off of the power source by the power source control apparatus 50 can be carried out. In addition, in the case where the power source management flag is "OFF", the power source on/off control by the power source control apparatus 50 is not carried out but the power source on/off is manually carried out by the user. Further, in the room table 523, the system manager or the like can perform the processing such as creation, updating, and deletion in accordance with increase of rooms and change of arrangement of the image forming apparatus.

FIG. 6 is an explanatory view showing a record layout of the state table 524. The state table 524 is constituted by data items such as a power source state showing if the power sources of respective image forming apparatuses 11, 12, 13, 21, 22, 23, 31, 32 and 33 are on state or off state, and an operating condition showing which mode, for example, a normal mode, a power saving mode (a standby mode) or a stop mode respective image forming apparatuses 11, 12, 13, 21, 22, 23, 31, 32 and 33 are in. For example, it is shown that the image forming apparatus 11 has the power source in an on state and the apparatus 11 itself is in a normal mode and further, it is shown that the image forming apparatus 12 has the power source in the on state and the apparatus 12 itself is in a power saving mode. Further, the state table 524 is updated by the control unit 51 depending on change of the states of respective image forming apparatuses 11, 12, 13, 21, 22, 23, 31, 32 and 33.

FIG. 7 is an explanatory view showing a record layout of the entrance/exited state table 525. The entrance/exited state table 525 is constituted by data items such as an entrance state (namely, the user ID of the user who enters the room and a time when the user enters the room), a leaving state (namely, the user ID of the user who leaves the room, a time when the user leaves the room) of the user of each room, and the user ID of the person who is present in the room. For example, it is shown that, in the room 10, the users whose user IDs are "100000", "100001", "100002" . . . enter the room at respective times; the users whose user IDs are "100001", "100002" . . . leave the room at respective times; and the user whose user ID is "100000" is present in the room at the present moment. Further, the entrance/exited state table 525 is updated by the control unit 51.

FIG. 8 is an explanatory view showing a record layout of the usage history table 526. The usage history table 526 records a usage history of each of the image forming apparatuses 11, 12, 13, 21, 22, 23, 31, 32 and 33, namely, the information about a frequency in use and the usage history table 526 is constituted by data items such as a user ID of a user who uses the image forming apparatus, the processing contents (for example, copying, printing, FAX transmission, or the like), the number of processed sheets (for example, the number of sheets of copying, the number of sheets of printing, the number of FAX transmissions, or the like), and date and hour when the processing is carried out. With reference to the usage history table 526, the control unit 51 can select a required image forming apparatus from among the image forming apparatus with a high frequency in use or the image forming apparatus which has been used previously according to the state of use. The usage history table 526 is updated by the control unit 51.

Figure 9:
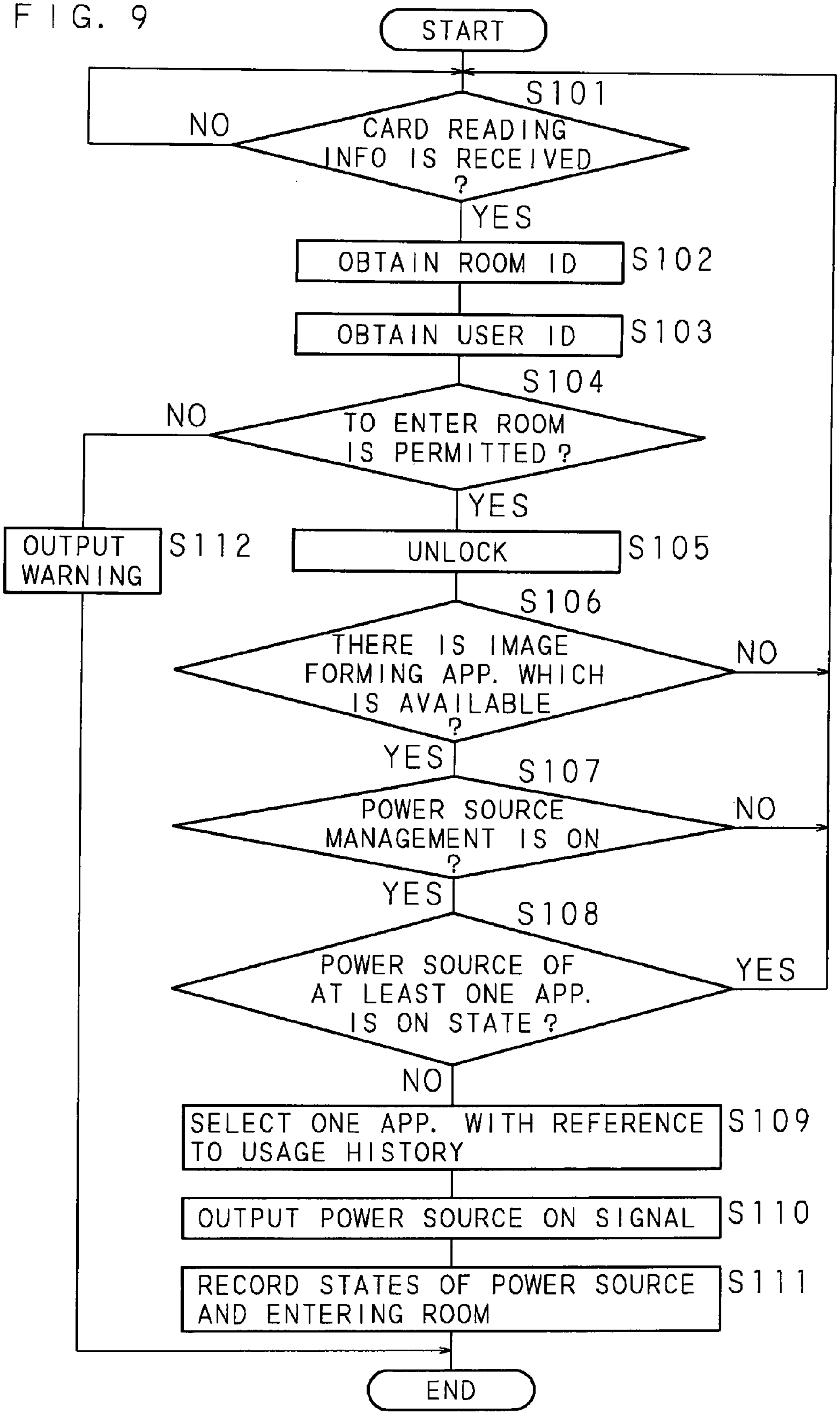
FIG. 9 is a flow chart showing a procedure of processing for power source turning on control carried out by a power source control apparatus.

Next, the operation of the power source control apparatus 50 will be described. First, the power source on control processing will be described. FIG. 9 is a flow chart showing a procedure of processing for controlling a power source carried out by the power source control apparatus 50, more specifically, the control unit 51 thereof. This flow chart includes the authentication processing in the case where a user enters the room during processing for turning on the power source.

The control unit 51 judges whether or not the card reading information is received from any of the rooms 10, 20 and 30, namely, from any of the card readers 14, 24 and 34 (S101). When no card reading information is received (NO in S101), by repeating the processing of step S101, the control unit 51 stands by till the card reading information is received. When the card reading information is received (YES in S101), the control unit 51 obtains the room ID and the user ID from among the received card reading information (S102 and S103).

The control unit 51 judges whether or not the obtained user ID is permitted to enter the room with reference to the authorization table 522 (S104). When the user is permitted to enter the room (YES in S104), the control unit 51 unlocks door lock (S105). Thereby, the user can enter a desired room among the rooms that the user is permitted to enter.

With reference to the authorization table 522, the control unit 51 judges whether or not there is an image forming apparatus which is available for the user whose user ID is obtained (which this user is permitted to use) (S106). When there is an available image forming apparatus (YES in S106), with reference to the room table 523, the control unit 51 judges whether or not the power source of the available image forming apparatus is managed (whether or not the power source management flag is ON or OFF) (S107).

When the power source is managed (when the power source management flag is ON) (YES in S107), the control unit 51 judges whether or not a power source of at least one image forming apparatus among the image forming apparatuses whose power sources are managed is on state with reference to the "power source state" of the state table 524 (S108). When there is no image forming apparatus whose power source is in the on state (NO in S108), namely, in the case where the power sources of all of the image forming apparatuses are off states, which is available for the user whose user ID is obtained and whose power sources are managed, the control unit 51 selects one apparatus having the highest frequency in use with reference to the usage history table 526 (S109), and outputs the power source on signal to the power source switching unit so as to make the power source of the selected image forming apparatus to be turned on (S110).

The control unit 51 records the state of the power source and the state of entering the room (S111). Thereby, the state table 524 and the entrance/exited state table 525 are updated, and the processing is terminated.

In step S104, when there is no permission for entrance (NO in S104), the control unit 51 outputs a warning to a predetermined apparatus such as a display connected to the power source control apparatus 50 or a warning lamp or the like provided to the card reader (S112), and the processing is terminated.

When there is no available image forming apparatus (NO in S106), the control unit 51 repeats the above-described processing by returning the processing to step S101. In addition, when there is no image forming apparatus whose power source is managed (NO in S107), assuming that the power source of the image forming apparatus is manually turned on/off by the user, the control unit 51 repeats the above-described processing by returning the processing to step S101. In addition, when the power source of at least one image forming apparatus is on state (YES in S108), the control unit 51 repeats the above-described processing by returning the processing to step S101. Thereby, in the case where the power source of at least one apparatus among the image forming apparatuses which is available for the user who enters any room is on state, this power source is not turned on even if there is another image forming apparatus which is available and whose power source is off state.

FIG. 10A and FIG. 10B are explanatory views showing a specific example of power source on control as described above. As shown in FIG. 10A, it is assumed that a user "U1" is present in the room 10, the image forming apparatuses which the user "U1" is permitted to use among the image forming apparatuses 11, 12 and 13 installed in the room 10 are the image forming apparatuses 11 and 12 (represented by a circle in the figure), and the image forming apparatus which the user "U1" is not permitted to use among the image forming apparatuses 11, 12 and 13 installed in the room 10 is the image forming apparatus 13 (represented by no mark in the figure). In addition, it is assumed that the power sources of the image forming apparatuses 11 and 12 have been already turned on.

When a user "U2" enters the room as shown in FIG. 10B from the state shown in FIG. 10A, it is assumed that the image forming apparatuses which is available for the user "U2" are the image forming apparatuses 11 and 13. In this case, since the power source of the image forming apparatus 11 which is available for the user "U2" has been already turned on, the power sources of the image forming apparatuses 11 and 12 are kept to be turned on and the power source of the image forming apparatus 13 is not turned on.

As described above, when a user enters a certain room, by immediately turning on of the power source of only the image forming apparatus which is available for this user, warming up is completed and this apparatus becomes available early, so that convenience for the user can be improved. In other words, since the power source of the image forming apparatus is turned on when the user enters a certain room, preparation necessary for warming up is in progress or has been terminated till the user approaches the image forming apparatus after entering the room. As a result, as compared to the case where the user turns on the power source by operating the operation unit 115 of the image forming apparatus, the user can immediately use the image forming apparatus and this improves convenience for the user.

In addition, one apparatus having the highest frequency in use is selected from among the image forming apparatuses in a certain room which is available for the user who enters the certain room and the power source of only this selected image forming apparatus is turned on, and thereby, it is possible to reduce power consumption of the entire room. In addition, in the case where the image forming apparatus in a certain room which is available for the user who enters the room has been already turned on, even if there are other available image forming apparatuses, the power sources of these image forming apparatuses are not turned on, so that it is possible to reduce the power consumption more.

Figure 11A:
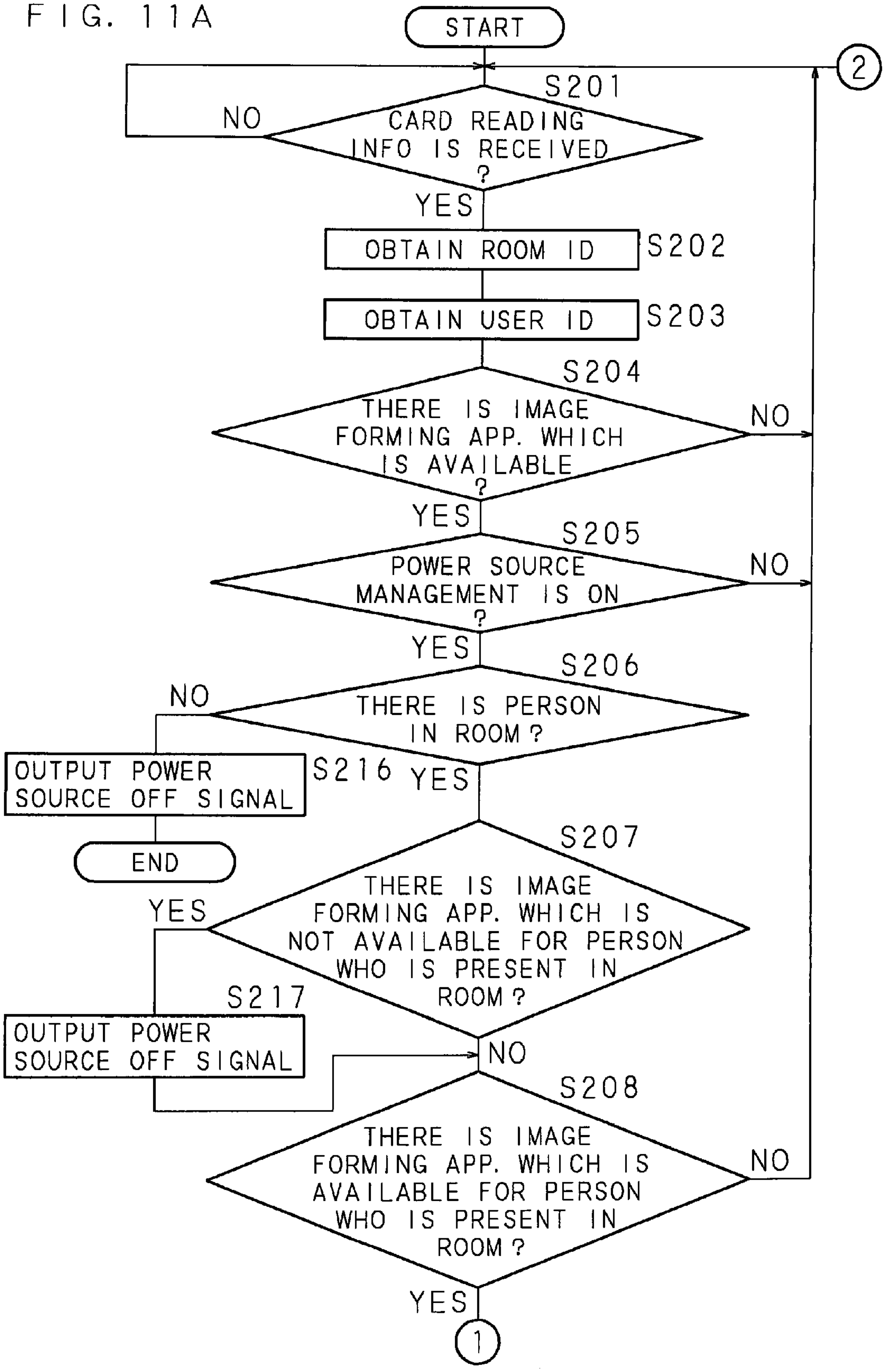
FIG. 11A and FIG. 11B are flow charts showing the procedure of power source off control processing carried out by the power source control apparatus.
Figure 11B:
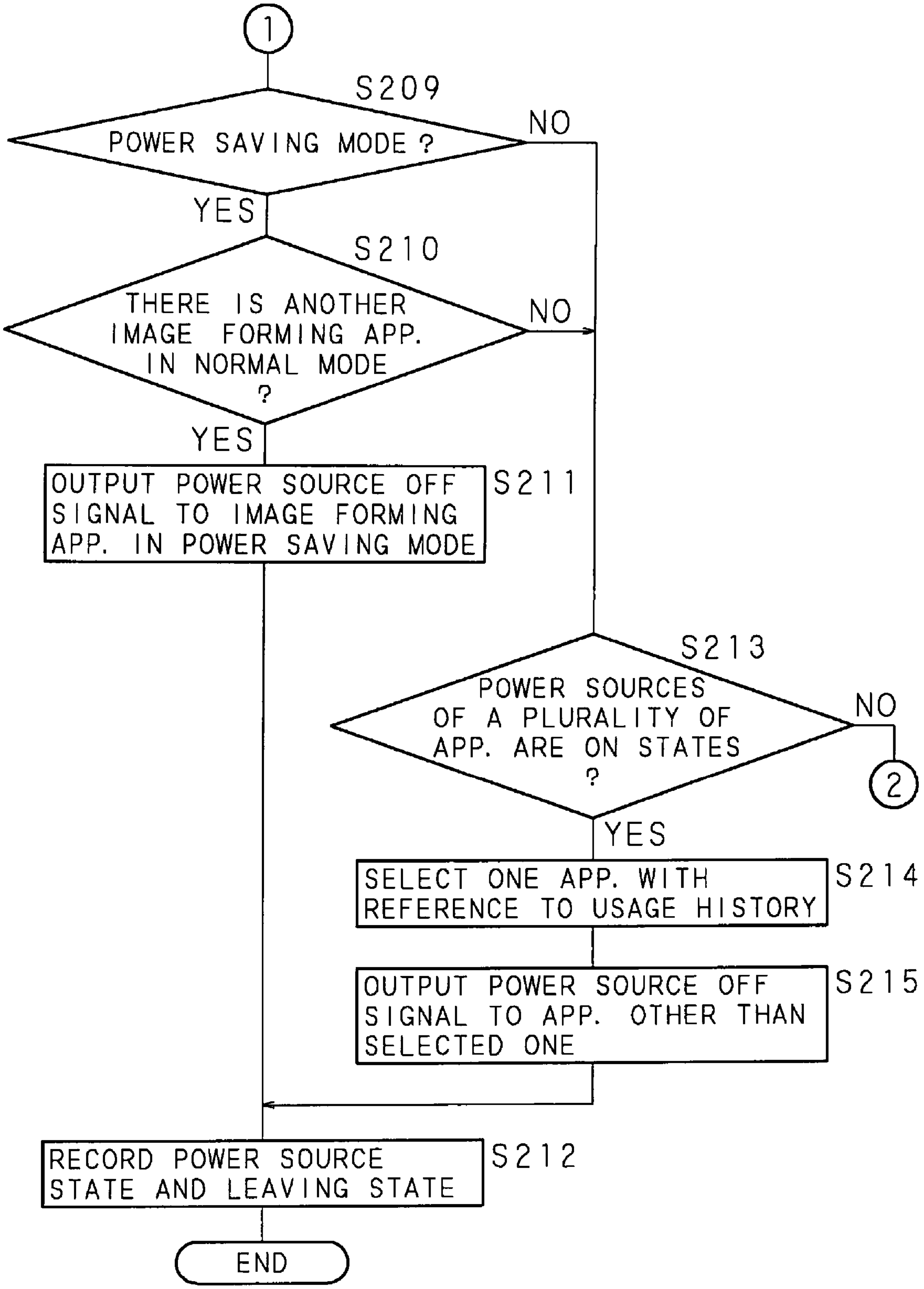

Next, the power source off control processing will be described. FIG. 11A and FIG. 11B are flow charts showing the procedure of the power source off control processing carried out by the power source control apparatus 50, more specifically, the control unit 51 thereof. The control unit 51 judges whether or not the card reading information is received from any of the rooms 10, 20 or 30, namely, any of the card readers 14, 24 or 34 (S201). When the card reading information is not received (NO in S201), the control unit 51 stands by till the card reading information is received by repeating the processing of step S201. When the card reading information is received (YES in S201), the control unit 51 obtains the room ID and the user ID from the received card reading information (S202 and S203).

With reference to the authorization table 522, the control unit 51 judges whether or not there is an image forming apparatus which is available for the user whose user ID is obtained (the user who is permitted to use the apparatus) (S204). When there is an available image forming apparatus (YES in S204), with reference to the room table 523, the control unit 51 judges whether or not the power source of the available image forming apparatus is managed (whether the power source management flag is ON or OFF) (S205).

When the power source is managed (when the power source management flag is ON) (YES in S205), with reference to the entrance/exited state table 525, the control unit 51 judges whether or not there is a person who is present in the room (S206). When there is a person who is present in the room (YES in S206), with reference to the authorization table 522 and the room table 523, the control unit 51 judges whether or not there is an image forming apparatus which is not available for the person who is present in the room (which the person who enters the room is not permitted to use) (S207). When there is no image forming apparatus which is not available (NO in S207), the control unit 51 judges whether or not there is an image forming apparatus which is available for the person who is present in the room (S208).

When there is an image forming apparatus which is available for the person who is present in the room (YES in S208), with reference to the state table 524, the control unit 51 judges whether or not the image forming apparatus is in the power saving mode (S209). When the image forming apparatus is in the power saving mode (YES in S209), the control unit 51 judges whether or not there is another image forming apparatus in the normal mode (S210). When there is another image forming apparatus in the normal mode (YES in S210), the control unit 51 outputs the power source off signal to the power source switching unit so as to turn off the power source of the image forming apparatus in the power saving mode (S211). The control unit 51 records the power source state and the leaving state (S212). Thereby, the state table 524 and the entrance/exited state table 525 are updated, and the processing is terminated.

When the image forming apparatus is not in the power saving mode (NO in S209), the control unit 51 judges whether or not the power sources of a plurality of image forming apparatuses are on states (S213). When the power sources of the plurality of image forming apparatuses are on states (YES in S213), with reference to the usage history table 526, the control unit 51 selects one apparatus with the highest frequency in use (S214), outputs the power source off signal to the power source switching unit so as to turn off the power source of the image forming apparatus other than the selected image forming apparatus (S215), and carries out the processing of the above-described step S212.

In step 210, when there is no other image forming apparatus in the normal mode (NO in S210), the control unit 51 carries out the processing on and after the above-described step S213. In this case, when the power sources of the plurality of image forming apparatuses are not on states (NO in S213), the control unit 51 repeats the above-described processing by returning the processing to step S201.

In step S206, when there is no person who is present in the room (NO in S206), with reference to the state table 524, the control unit 51 outputs a power source off signal to the power source switching unit so as to turn off all of the power sources of the image forming apparatuses in the power on state (S216) and then, the control unit 51 terminates the processing.

In addition, in step S207, in the case where there is an image forming apparatus which is not available for the person who is present in the room (YES in S207), the control unit 51 outputs the power source off signal to the power source switching unit so as to turn off these power sources (S217) and carries out the processing on and after the above-described step S208.

When there is no available image forming apparatus (NO in S204), the control unit 51 continues the processing on and after step S201. In addition, when there is no image forming apparatus whose power source is managed (NO in S205), the control unit 51 repeats the above-described processing by returning the processing to step S201. In addition, in the case where there is no image forming apparatus which is available for the person who is present in the room (NO in S208), the control unit 51 repeats the above-described processing by returning the processing to step S201.

FIG. 12A and FIG. 12B are explanatory views showing a specific example of the above-described power source turning off control. As shown in FIG. 12A, it is assumed that users "U3" and "U4" are present in the room 10, the image forming apparatuses 11 and 12 (represented by a circle in the figure) are permitted for the user "U3" to use among the image forming apparatuses 11, 12 and 13 installed in the room 10, and the image forming apparatuses 11, 12 and 13 (represented by a circle in the figure) are permitted for the user "U4" to use among the image forming apparatuses 11, 12 and 13 installed in the room 10. In addition, it is assumed that the power sources of all the image forming apparatuses 11, 12 and 13 are turned on. Further, it is assumed that the image forming apparatus 11 is in the power saving mode (in the figure, represented by a circle with a hatched line).

When the user "U4" leaves the room as shown in FIG. 12B from the state shown in FIG. 12A, it is assumed that the power source of the image forming apparatus 13 which is not available for the user "U3" who is present in the room is turned off. In addition, the power sources of the image forming apparatuses 11 and 12 which is available for the user "U3" who is present in the room are on states, and the image forming apparatus 11 is in the power saving mode. Accordingly, the power source of the image forming apparatus 11 in the power saving mode is turned off, and the power source of the image forming apparatus 12 not in the power saving mode is kept to be turned on.

As described above, in the case where a user leaves a certain room, first, when there is no other person in the room, by turning off the power sources of all image forming apparatuses, it is possible to reduce power consumption of the entire room. In addition, when there is still another person in a certain room when a user leaves the room, the power source of at least one apparatus among the image forming apparatuses which is available for the person who is present in the room is kept to be turned on. Thereby, it is possible to improve convenience for the user who is present in the room while reducing power consumption. In addition, in the case where the power source of at least one image forming apparatus is kept to be on state, in accordance with the usage history of the image forming apparatus, the power source of the image forming apparatus with the high frequency in use is made to be on state and this makes the power source of the image forming apparatus likely to be used by a user into the on state. As a result, it is possible to turn off the power source of the image forming apparatus which is not likely to be used by the user, so that a power saving effect can be expected without reducing convenience for the user. In addition, in the case where some apparatuses are in the power saving mode and other apparatuses are in the normal mode among the image forming apparatuses which is available for a person who is present in the room, by turning off the power source of the image forming apparatus in the power saving mode, the image forming apparatus not likely to be used by the person who is present in the room is selected and the power source is turned off. Also in this case, power consumption can be reduced without reducing convenience for the user.

Figure 13:
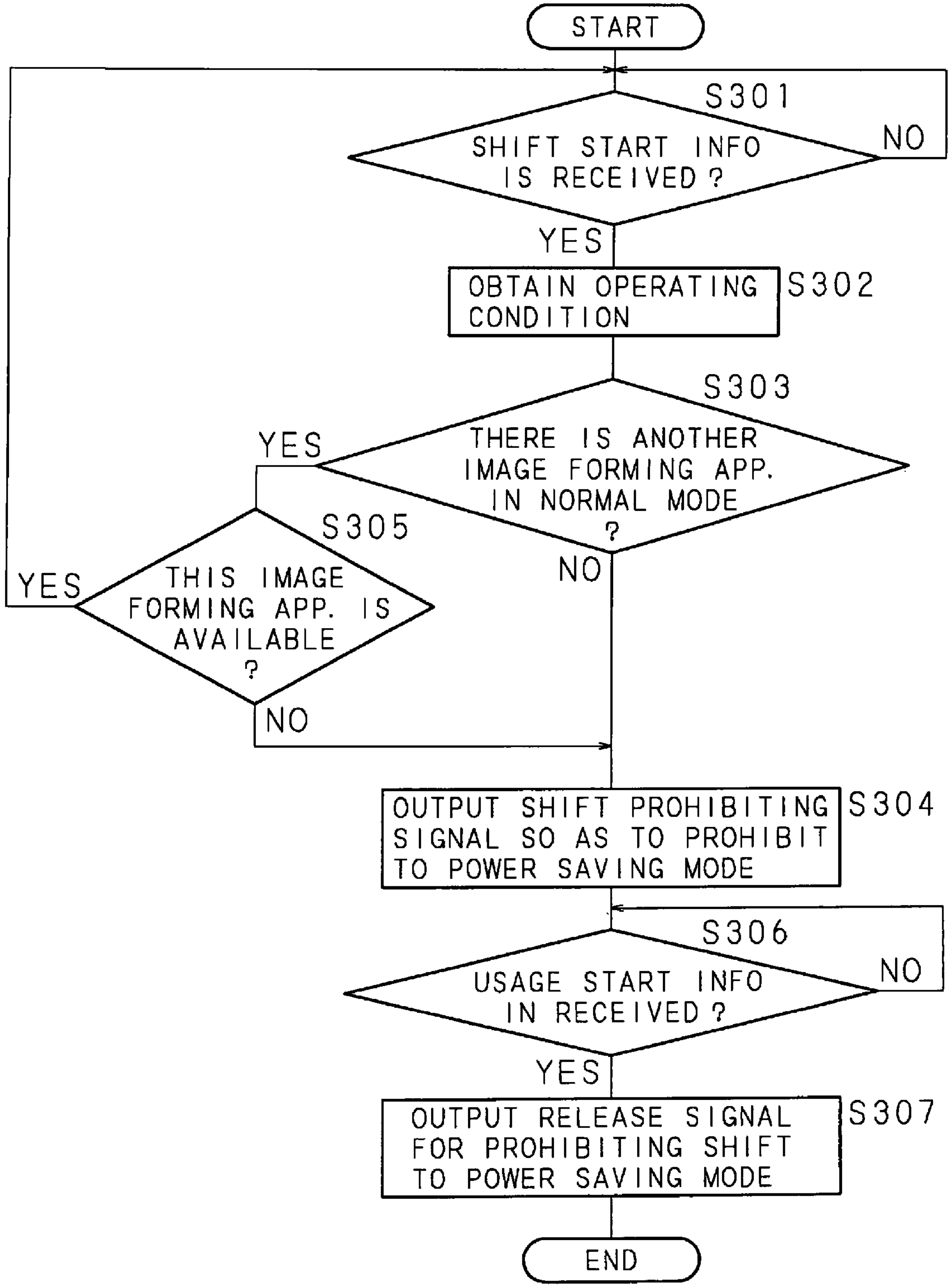
FIG. 13 is a flow chart showing a procedure of power saving mode shifting control processing carried out by the power source control apparatus.

Next, the power saving mode shifting control processing will be described. FIG. 13 is a flow chart showing a procedure of the power saving mode shifting control processing carried out by the power source control apparatus 50, specifically, by the control unit 51 thereof. Further, in this case, the image forming apparatuses 11, 12, 13, 21, 22, 23, 31, 32 and 33 have a function to be automatically shifted from a normal mode into a power saving mode when they have not been used for a predetermined time continuously, and they transmit the shift start information to the power source control apparatus 50 at the time of shifting into the power saving mode.

The control unit 51 judges whether or not the shift start information is received (S301), and then, when the shift start information is not received (NO in S301), by repeating the processing of step S301, the control unit 51 stands by till the shift start information is received. When the shift start information is received (YES in S301), with reference to the state table 524, the control unit 51 obtains the operating condition of the image forming apparatus installed in the room where the image forming apparatus transmitted the received shift start information is installed (S302).

The control unit 51 judges whether or not there is another image forming apparatus in the normal mode (S303), and then, when there is no other image forming apparatus in the normal mode (NO in S303), the control unit 51 outputs the shift prohibiting signal so as to prohibit the image forming apparatus which has transmitted the shift start information from being shifted to the power saving mode (S304). Thereby, it is prevented that all of the image forming apparatuses installed in the room where the image forming apparatus which has transmitted the shift start information are shifted into the power saving mode, so that at least one apparatus is made into the normal mode.

The control unit 51 judges whether or not the usage start information indicating that the user starts to use the image forming apparatus is received (S306). When the power source control apparatus 50 is not received (NO in S306), by repeating the processing of step S306, the control unit 51 stands by till the usage start information is received. When the usage start information is received (YES in S306), the control unit 51 releases prohibition of shifting to the power saving mode by outputting a release signal for prohibiting shift to the power saving mode (S307), and the processing is terminated.

When there is another image forming apparatus in the normal mode (YES in S303), the control unit 51 judges whether or not this apparatus is the image forming apparatus which is available for the user (S305). When this apparatus is not the image forming apparatus which is available for the user (NO in S305), the control unit 51 carries out the processing on and after the above-described step S304. On the other hand, in the case where this apparatus is the image forming apparatus which is available for the user (YES in S305), returning the processing to step S301, the control unit 51 repeats the above-described processing.

FIG. 14A, FIG. 14B, FIG. 1SA and FIG. 15B are explanatory views showing specific examples of the above-described power saving mode shifting control. As shown in FIG. 14A, it is assumed that users "U7" and "U8" are present in the room 10, the image forming apparatuses 11 and 12 (represented by a circle in the figure) are permitted for the user "U7" to use among the image forming apparatuses 11, 12 and 13 installed in the room 10, and the image forming apparatuses 12 and 13 (represented by a circle in the figure) are permitted for the user "U8" to use among the image forming apparatuses 11, 12 and 13 installed in the room 10. In addition, it is assumed that the power sources of all image forming apparatuses 11, 12 and 13 are on states. It is assumed that the state obtained since a predetermined time has passed from this time is shown in FIG. 14B.

As shown in FIG. 14B, in the case where the image forming apparatus 11 is shifted to the power saving mode because the image forming apparatus 11 is not used even a predetermined time has passed (in the figure, represented by a circle with a hatched line), the user "U7" who is present in the room can use the image forming apparatus 12 and in the same way, the user "U8" who is present in the room can use the image forming apparatuses 12 and 13. In this case, even if the image forming apparatus 11 is shifted into the power saving mode, other than the image forming apparatus 11, there is an image forming apparatus (a normal mode) which can be immediately used by the users "U7" and "U8". Accordingly, the image forming apparatus 11 is shifted into a power saving mode.

On the other hand, as shown in FIG. 15A, it is assumed that users "U5" and "U6" are present in the room 10, the image forming apparatus 11 (represented by a circle in the figure) is permitted for the user "U5" to use among the image forming apparatuses 11, 12, and 13 installed in the room 10, and the image forming apparatuses 12 and 13 (represented by a circle in the figure) are permitted for the user "U6" to use among the image forming apparatuses 11, 12, and 13 installed in the room 10. In addition, it is assumed that the power sources of all image forming apparatuses 11, 12, and 13 are turned on. It is assumed that the state obtained since a predetermined time has passed from this time is shown in FIG. 15B.

As shown in FIG. 15B, in the case where the image forming apparatus 11 is shifted to the power saving mode because the image forming apparatus 11 is not used even a predetermined time has passed, there is no image forming apparatus (a normal mode) which can be immediately used by the user "U5" who is present in the room 10. In this case, shift of the image forming apparatus 11 into the power saving mode is prohibited (in the figure, represented by a circle with a hatched line) and a normal mode state is kept.

As described above, since one apparatus among the image forming apparatuses which is available for a user who is present in a certain room is not shifted into the power saving mode, convenience for the user can be improved.

Figure 16:
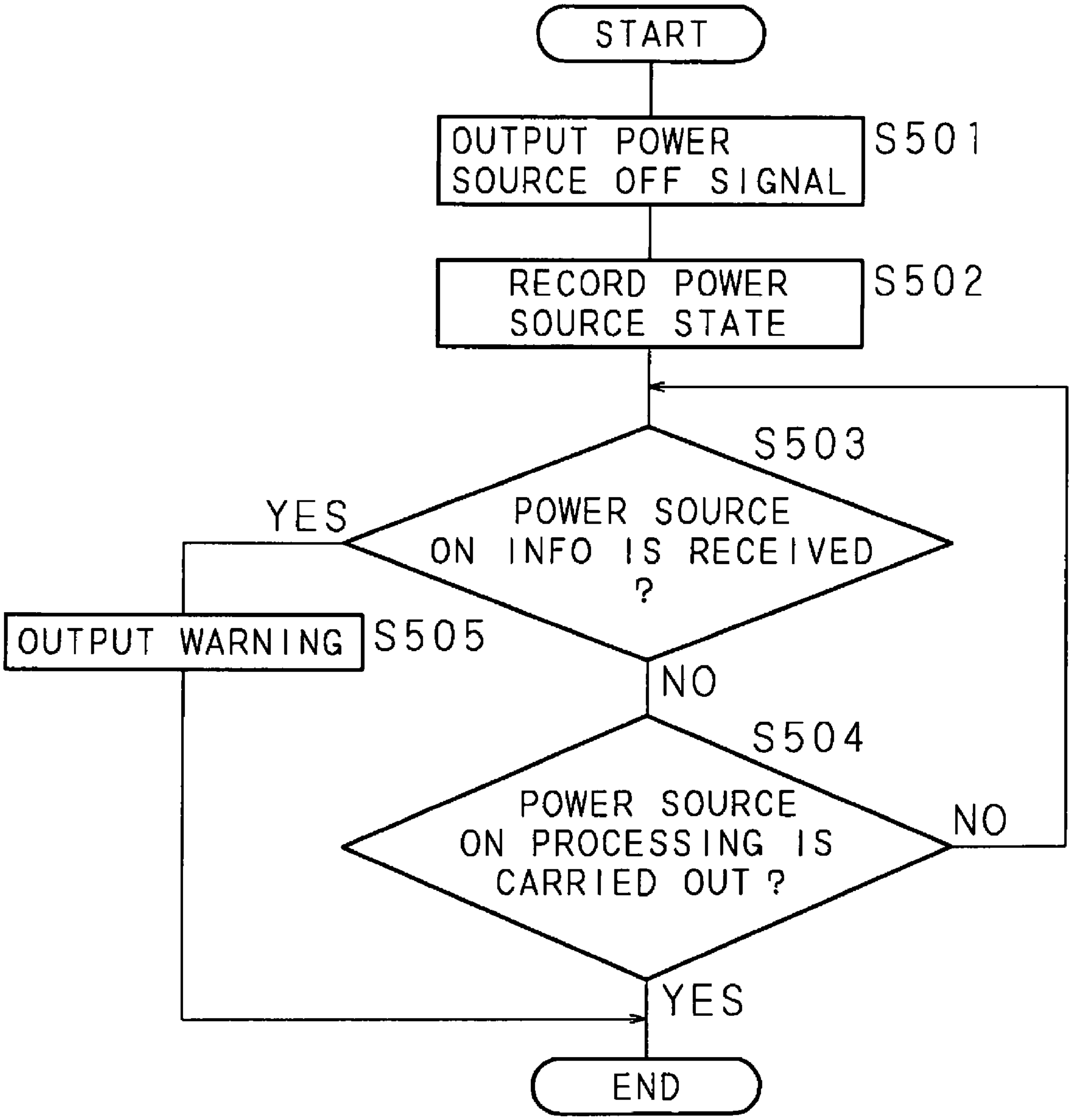
FIG. 16 is a flow chart showing a procedure of power source state monitoring processing carried out by the power source control apparatus.

Next, power source state monitoring processing will be described. FIG. 16 is a flow chart showing a procedure of the power source state monitoring processing carried out by the power source control apparatus 50, more specifically, by the control unit 51 thereof. Further, FIG. 16 shows the processing for monitoring that the power source in an off state of the image forming apparatus is illegally turned on. The control unit 51 outputs the power source off signal so as to make the image forming apparatus whose power source is needed to be turned off into an off state (S501), and records the power source state of this image forming apparatus in the state table 524 (S502). After that, the control unit 51 judges whether or not the power source on information is received from the image forming apparatus having its power source turned off (S503).

When the power source on information is not received (NO in S503), the control unit 51 judges whether or not the power source on processing for turning on the power source of the image forming apparatus, whose power source was turned off, again is carried out (S504). When the power on processing is carried out (YES in S504), the power source of the image forming apparatus is turned on due to legal processing, so that the control unit 51 terminates the processing.

When the power source on processing is not carried out (NO in S504), the control unit 51 repeats the above-described processing by returning the processing to step S503. Then, in the case of receiving the power source on information during this period (YES in S503), the control unit 51 judges that the power source is illegally turned on, outputs a warning to a predetermined apparatus such as a display connected to the power source control apparatus 50 (S505), and terminates the processing. Accordingly, in the above-described case, due to the loop processing of steps S503 and S504, the illegal on-operation of the power source will be monitored.

In addition, the processing for monitoring that the power source of the image forming apparatus whose power source is in the on state is illegally turned off can be realized by replacing on with off and off with on in the above-described processing, so that the explanation thereof is omitted herein. As described above, it is possible to warn against the unconsidered operation of the power source and this makes it possible to improve security.

Figure 17:
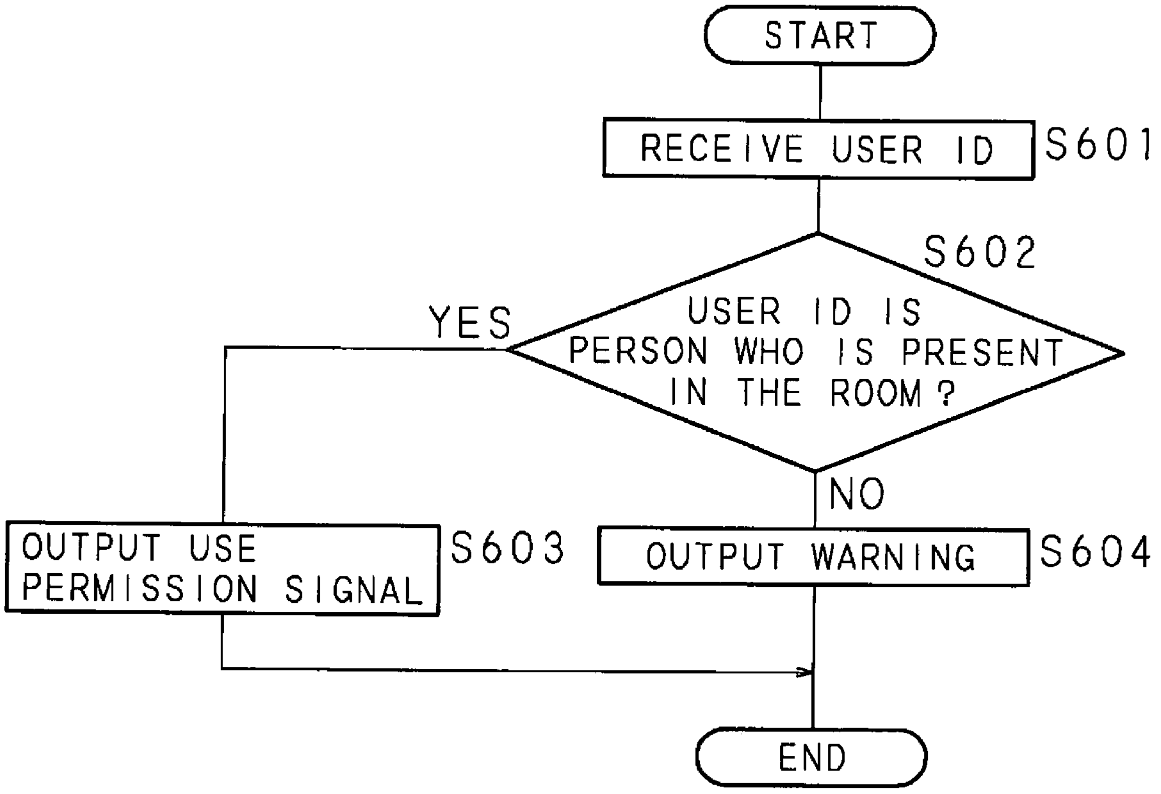
FIG. 17 is a flow chart showing a procedure of usage monitoring processing carried out by the power source control apparatus.

Next, usage monitoring processing of the image forming apparatus will be described. FIG. 17 is a flow chart showing a procedure of the usage monitoring processing carried out by the power source control apparatus 50, more specifically, by the control unit 51 thereof. According to the procedure shown in this flow chart, the image forming apparatus transmits the user ID which is obtained by the operation by the user to the power source control apparatus 50, and the power source control apparatus 50 monitors the illegal usage of the image forming apparatus by judging whether or not the received user ID is the registered user ID.

Receiving the user ID which is transmitted by the image forming apparatus (S601) and referring to the entrance/exited state table 525, the control unit 51 judges whether or not the received user ID coincides with the user ID of the person who is present in the room, specifically, the user ID which is read by the card reader (S602).

When the user ID received from the image forming apparatus coincides with the user ID of the person who is present in the room (YES in S602), the control unit 51 outputs a use permission signal indicating use permission of the image forming apparatus (S603), and terminates the processing. On the other hand, in the case where the user ID received from the image forming apparatus does not coincide with the user ID of the person who is present in the room (NO in S602), the control unit 51 outputs a warning to a predetermined apparatus such as a display which is connected to the power source control apparatus 50 (S604), and terminates the processing.

As described above, according to the present invention, it is possible to warn against usage of the image forming apparatus by a person who is not permitted to enter a certain room and this makes it possible to improve security.

According to the above-described example, the image forming apparatuses 11, 12, 13, 21, 22, 23, 31, 32 and 33 have a function to be automatically shifted from the normal mode into the power saving mode when they have not been used for a predetermined time and they transmit the shift start information to the power source control apparatus 50 when they are shifted into the power saving mode. However, the present embodiment is not limited to this. For example, at the side of the power source control apparatus 50, by judging the image forming apparatus which is shifted to the power saving mode, it is possible to shift the image forming apparatus from the normal mode into the power saving mode. In this case, the control unit 110 of each image forming apparatus performs processing for shifting the apparatus from the normal mode into the power saving mode in accordance with the instruction from the power source control apparatus 50.

Figure 18:
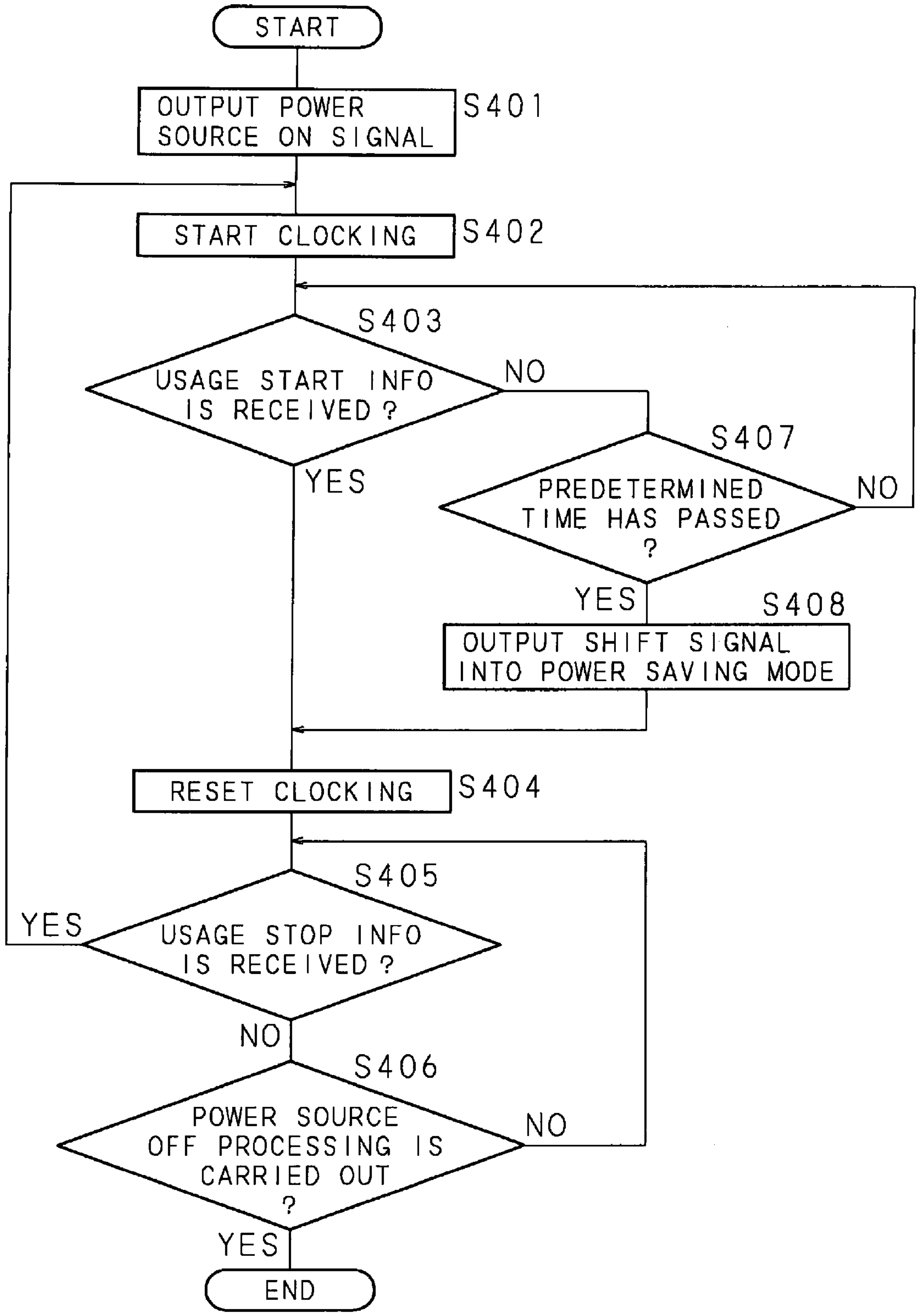
FIG. 18 is a flow chart showing another procedure of the power saving mode shifting control processing carried out by the power source control apparatus.

FIG. 18 is a flow chart showing another procedure of power saving mode shifting control processing carried out by the power source control apparatus 50, more specifically, by the control unit 51 thereof. The control unit 51 outputs the power source on signal so as to make the power source of the image forming apparatus whose power source should be turned on into an on state (S401), and starts clocking of a lapsed time from this point of time (S402). The control unit 51 judges whether or not the usage start information transmitted from the image forming apparatus is received (S403), and in the case where the usage start information is received (YES in S403), the control unit 51 resets clocking (S404).

After that, the control unit 51 judges whether or not the usage stop information transmitted from the image forming apparatus whose power source is turned on is received (S405), and in the case where the usage stop information is not received (NO in S405), the control unit 51 judges whether or not the power source off processing for turning off the power source of the image forming apparatus, whose power source was turned on, again is carried out (S406). When the power source off processing is carried out (YES in S406), the control unit 51 terminates the processing.

In step S403, in the case where the usage start information is not received (YES in S403), the control unit 51 judges whether or not a predetermined time has passed (S407). When a predetermined time has passed (YES in S407), judging that the image forming apparatus has not been used for a predetermined time, the control unit 51 outputs a shift signal for shifting the image forming apparatus into the power saving mode (S408), and carries out the processing on and after the above-described step S404. Thereby, it is possible to reduce the power consumed by the image forming apparatus which has not been used for a predetermined time.

On the other hand, when a predetermined time has not passed (NO in S407), the control unit 51 repeats the same processing as above by returning the processing to step S403. In addition, in the case of receiving the usage stop information in step S405 (YES in S405), the control unit 51 repeats the same processing as above by returning the processing to step S402. In addition, in the case where the power source off processing is not carried out in step S406 (NO in S406), the control unit 51 returns the processing to step S405, and monitors the state of the power source due to loop processing in steps S405 and S406.

As described above, even in the case where the image forming apparatus does not have a function to be automatically shifted to a power saving mode by itself, power consumption can be reduced when the power source control apparatus 50 judges the image forming apparatus which has not been used for a predetermined time and shifts it into the power saving mode.

As described above, according to the present invention, when a user enters a room, the image forming apparatus becomes available early after completion of warming up since the power source of the image forming apparatus is immediately turned on. Thereby, the user can carry out the first processing (for example, copying, printing or the like) earlier and this makes it possible to improve convenience for the user. In addition, when the user leaves the room, the power source of the image forming apparatus is turned off, so that it is possible to reduce power to be consumed by the image forming apparatus.

In addition, when a user enters a room, by immediately turning on only the power source of the image forming apparatus which is available for the user, and when the user leaves the room, by immediately turning off only the power source of the image forming apparatus which is available for the user, it is possible to reduce power consumption more and to improve convenience for the user more depending on the user who is present in the room.

In addition, also by turning on the power source of only the image forming apparatus having the highest frequency in use, it is possible to reduce power consumption more. In addition, in the case where the power source of the image forming apparatus which is available for the user who enters the room has been already turned on, by preventing the power source of another image forming apparatus which is available for that user from being turned on, it is possible to reduce power consumption more.

In addition, according to the present invention, a power source of at least one apparatus among the image forming apparatuses which is available for a user is kept to be on state when the user is present in the room, so that convenience for the user who is present in the room can be improved while reducing power consumption. In addition, also by turning off the power source of the image forming apparatus shifted into the power saving mode, namely, by turning off the power source of the image forming apparatus which the user who is present in the room has not used for a predetermined time, it is possible to reduce power consumption without reducing convenience for the user. In addition, by preventing one apparatus among the image forming apparatuses which the user who is present in the room can use from being shifted into the power saving mode, convenience for the user can be improved. In addition, even in the case where the image forming apparatus has no function to be shifted into a power saving mode by itself, power consumption can be reduced.

Further, according to the present invention, it is possible to warn against an unconsidered operation of the power source and further, it is possible to warn against usage of the image forming apparatus by a person who is not permitted to enter the room. As a result, security can be improved.

The above-described embodiment is described using a digital complex machine as an example of the image forming apparatus, however, the image forming apparatus is not limited to the digital complex machine but it may be a scanner, a printer, a copier, a facsimile apparatus or the like. In addition, a space where entrance and exit are managed is not limited to a room but it may be a place which is segmented by some means. Further, the apparatus to be installed in the room or the like is not limited to the image forming apparatus but may be other business machines and electric machines if on and off of its power source is controlled.

According to the above-described embodiment, the power source switching units 15, 25 and 35 are provided in respective rooms, however, the present invention is not limited to this. For example, providing a unit for switching the power source in the interior of each image forming apparatus, the power source of the image forming apparatus may be turned on/off in accordance with the power source on/off signal from the power source control apparatus 50.

The contents of the state table 524 and the entrance/exited state table 525, which are employed in the above-described embodiment, may be displayed on a display connected to the power source control apparatus 50. Thereby, for example, the system manager can collectively grasp the state of the image forming apparatus and the state of the person who enters or leaves the room on a steady basis.

According to the above-described embodiment, the case where the image forming apparatus is installed in each room is described, however, in each room, many personal computers used by each user may be installed. In such a case, selecting the image forming apparatus installed in the nearest location to the personal computer used by the user who enters the room, the power source of the selected image forming apparatus may be turned on. Further, in this case, the information relating the user ID with the personal computer may be stored in advance and the information about a distance between the personal computer and the image forming apparatus or the like may be stored.

According to the above-described embodiment, a person who leaves the room is not particularly authenticated when leaving the room, however, by authenticating the person who leaves the room when leaving the room, the door locking device of the room may be unlocked as same as when the person enters the room.

Various tables according to the above-described embodiment are merely an example and the present invention is not limited to this.

According to the above-described embodiment, the card readers 14, 24 and 34 may be used, however, the present invention is not limited to them. For example, when the user who enters and leaves the room can be identified, a card having a magnetic recording surface may be used in place of a system for reading the user ID recorded in an IC card wirelessly. In addition, a system for reading information about a finger mark, voice information or the like may be available. Further, providing a reader including a ten key or the like near the entrance of the room, the user may input a pass word.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. A power source control method of an image forming apparatus for controlling, by a control apparatus, turn-on or turn-off of a power source that can be controlled from outside of each of one or plural image forming apparatus(es) installed in a predetermined space where an entrance/exit detecting apparatus for detecting entrance and exit of a person is provided, comprising:

by the control apparatus, obtaining from the entrance/exit detecting apparatus entrance/exit information indicating entrance and exit of the person into the predetermined space; and by the control apparatus, controlling turn-on and turn-off of the power source of the one or plural image forming apparatus(es) on the basis of the obtained entrance/exit information, wherein the control apparatus judges whether at least one of the image forming apparatus(es) is in an ON state, and if not, then only a selected one of the image forming apparatus(es) having the highest frequency of use is turned ON.

2. The power source control method as set forth in claim 1, wherein the control apparatus comprises a use authorization storing unit for storing identification information of a person and one or plural image forming apparatus(es) which is/are available for each person in relation to each other; and the method further comprises:

by the control apparatus, obtaining from the obtained entrance/exit information the identification information for identifying a person who enters or leaves;

when the identification information of a person who enters is obtained, by the control apparatus, turning on the power source of the image forming apparatus stored in the use authorization storing unit in relation to the obtained identification information; and when the identification information of a person who leaves is obtained, by the control apparatus, turning off the power source of the image forming apparatus stored in the use authorization storing unit in relation to the obtained identification information.

3. The power source control method as set forth in claim 2, wherein the control apparatus further comprises a usage history storing unit for storing each usage history of the one or plural image forming apparatus(es) therein; and the method further comprises, when the identification information of a person who enters is obtained, by the control apparatus, turning on a power source of one apparatus among the image forming apparatuses stored in the use authorization storing unit in relation to the obtained identification information in accordance with the usage histories stored in the usage history storing unit.

4. The power source control method as set forth in claim 3, further comprising:

when the identification information of a person who enters is obtained, by the control apparatus, judging whether or not a power source of at least one apparatus among the image forming apparatuses stored in the use authorization storing unit in relation to the obtained identification information is turned on; and when it is judged that a power source of at least one apparatus is turned on, by the control apparatus, not turning on a power source of an image forming apparatus having a power source turned off among the image forming apparatuses stored in the use authorization storing unit in relation to the obtained identification information.

5. The power source control method as set forth in claim 4, wherein the control apparatus further comprises a present person identification information storing unit for storing the identification information of a person who is present in the predetermined space on the basis of a detection result of the entrance/exit detecting apparatus; and the method further comprises, when the identification information of the person who leaves is obtained, and there are the image forming apparatuses stored in the use authorization storing unit in relation to both of the obtained identification information of a person who leaves and the identification information stored in the present person identification information storing unit, not turning off a power source of at least one image forming apparatus among these apparatuses.

6. The power source control method as set forth in claim 5, wherein the control apparatus further comprises a stand-by information storing unit for storing stand-by information indicating that each of the one or plural image forming apparatus(es) is/are in a power saving state; and the method further comprises, when there are the image forming apparatuses stored in the use authorization storing unit in relation to both of the obtained identification information of a person who leaves and the identification information stored in the present person identification information storing unit, and there are the image forming apparatuses stored in the stand-by information storing unit among these apparatuses, by the control apparatus, turning off power sources of these apparatuses.

7. The power source control method as set forth in claim 6, further comprising:

by the control apparatus, obtaining from each image forming apparatus shift information indicating that each of the one or plural image forming apparatus(es) is/are shifted into a power saving state when they have not been used for a predetermined time;

when the shift information is obtained from one image forming apparatus among the one or plural image forming apparatus(es), by the control apparatus, judging existence or nonexistence of an image forming apparatus not in a power saving state other than the one image forming apparatus among the image forming apparatuses stored in the use authorization storing unit in relation to the identification information stored in the present person identification information storing unit; and when the result of judgment shows there is no image forming apparatus satisfying a condition, by the control apparatus, outputting a shift prohibiting signal for prohibiting the one image forming apparatus from being shifted into a power saving state.

8. The power source control method as set forth in claim 2, further comprising:

by the control apparatus, judging whether or not each of the one or plural image forming apparatus(es) has/have not been used for a predetermined time; and by the control apparatus, outputting a shift signal for shifting the one or plural image forming apparatus(es), which is/are judged not to be used for a predetermined time by the judgment, into the power saving state.

9. The power source control method as set forth in claim 7, further comprising:

by the control apparatus, obtaining from each image forming apparatus operation information indicating that a power source of each of the one or plural image forming apparatus(es) is turned on or turned off; and when the operation information indicating that the power source is turned off is obtained from the image forming apparatus whose power source is turned on by the control apparatus, or the operation information indicating that the power source is turned on is obtained from the image forming apparatus whose power source is turned off by the control apparatus, by the control apparatus, outputting a warning.

10. The power source control method as set forth in claim 9, wherein the one or plural image forming apparatus(es) has/have a function for accepting the identification information of a person who can use each of them; and the method further comprising:

by the control apparatus, obtaining the identification information of the person who can use each of the one or plural image forming apparatus(es) from the one or plural image forming apparatus(es);

by the control apparatus, judging whether or not the obtained identification information and the identification information stored in the present person identification information storing unit coincide with each other; and when the judgment results show they do not coincide with each other, by the control apparatus, outputting a warning.

11. A power source control system of an image forming apparatus including one or plural image forming apparatus (es) installed in a predetermined space and a power source control apparatus for controlling turn-on or turn-off of a power source of each of the one or plural image forming apparatus(es), wherein entrance/exit detecting means for detecting entrance and exit of a person to and from the predetermined space is provided in the predetermined space; and the control apparatus comprises:

entrance/exit information obtaining means for obtaining from the entrance/exit detecting means the entrance/exit information indicating entrance and exit of the person to and from the predetermined space; and controlling means for controlling turn-on and turn-off of the power source of each of the one or plural image forming apparatus(es) on the basis of the entrance/exit information obtained by the entrance/exit information obtaining means, wherein the controlling means judges whether at least one of the image forming apparatus(es) is in an ON state, and if not, then only a selected one of the image forming apparatus(es) having the highest frequency of use is turned ON.

12. The power source control system as set forth in claim 11, wherein the control apparatus further comprising: use authorization storing means for storing the identification information of a person and one or plural image forming apparatus (es) which is available for each person in relation to each other; and identification information obtaining means for obtaining identification information for identifying a person who enters or leaves from the entrance/exit information obtained by the entrance/exit information obtaining means; and the controlling means turns on a power source of the image forming apparatus stored in the use authorization storing means in relation to the identification information obtained by the identification information obtaining means when the identification information obtaining means obtains the identification information of a person who enters, and turns off a power source of the image forming apparatus stored in the use authorization storing means in relation to the identification information obtained by the identification information obtaining means when the identification information obtaining means obtains the identification information of a person who leaves.

13. The power source control system as set forth in claim 12, wherein the control apparatus further comprises usage history storing means for storing a usage history of each of the one or plural image forming apparatus(es); and when the identification information obtaining means obtains the identification information of the person who enters, the controlling means turns on a power source of one of the image forming apparatuses stored in the use authorization storing means in relation to the identification information obtained by the identification information obtaining means in accordance with the usage histories stored in the usage history storing means.

14. The power source control system as set forth in claim 13, wherein the control apparatus further comprises power source state judging means for judging whether a power source of each of the one or plural image forming apparatus(es) is turned on or turned off; and when the identification information obtaining means obtains the identification information of the person who enters, the controlling means makes the power source state judging means judge whether or not a power source of at least one apparatus among the image forming apparatuses stored in the use authorization storing means in relation to the identification information obtained by the identification information obtaining means is turned on; and when a power source of at least one apparatus is turned on, the controlling means does not turn on the power source of the image forming apparatus, whose power source is turned off, among the image forming apparatuses stored in the use authorization storing means in relation to the identification information obtained by the identification information obtaining means.

15. The power source control system as set forth in claim 14, wherein the control apparatus further comprises present person identification information storing means for storing identification information of a person who is present in the predetermined space on the basis of the detection result of the entrance/exit detecting means; and when the identification information obtaining means obtains the identification information of the person who leaves, and there are the image forming apparatuses stored in the use authorization storing means in relation to both of the identification information of the person who leaves obtained by the identification information obtaining means and the identification information stored in the present person identification information storing means, the control apparatus does not turn off a power source of at least one apparatus among them.

16. The power source control system as set forth in claim 15, wherein the control apparatus further comprises stand-by information storing means for storing stand-by information indicating that each of the one or plural image forming apparatus(es) is/are in a power saving state; and when there are image forming apparatuses stored in the use authorization storing means in relation to both of the identification information of the person who leaves obtained by the identification information obtaining means and the identification information stored in the present person identification information storing means, and there are the image forming apparatuses whose stand-by information is stored in the stand-by information storing means among them, the control apparatus turns off power sources of these apparatuses.

17. The power source control system as set forth in claim 16, wherein the control apparatus further comprises:

shift information obtaining means for obtaining shift information indicating that each of the one or plural image forming apparatus(es) is/are shifted into a power saving state from each of them when they have not been used for a predetermined time;

power saving state judging means for, when the shift information obtaining means obtains the shift information from one image forming apparatus among the one or plural image forming apparatus(es), judging existence and nonexistence of an image forming apparatus not in a power saving state other than the one image forming apparatus among the image forming apparatuses stored in the use authorization storing means in relation to the identification information stored in the present person identification information storing means; and power saving state shift prohibiting signal outputting means for, when the power saving state judging means judges that there is no image forming apparatus satisfying a condition, outputting a shift prohibiting signal in order to prohibit the one image forming apparatus from being made into a power saving state.

18. The power source control system as set forth in claim 12, wherein the control apparatus further comprises:

use state judging means for judging whether or not the each of one or plural image forming apparatus(es) has/have not been used for a predetermined time; and power saving shift signal outputting means for outputting a shift signal in order to shift one or plural image forming apparatus(es) which is/are judged by the use state judging means not to be used for a predetermined time into a power saving state.

19. The power source control system as set forth in claim 17, wherein the control apparatus further comprises:

operation information obtaining means for obtaining operation information indicating that a power source of each of the one or plural image forming apparatus(es) is/are turning on or turning off from each image forming apparatus; and means for outputting a warning when the operation information indicating that a power source is turned off is obtained from the image forming apparatus whose power source is turned on by the controlling means, or when the operation information indicating that a power source is turned on is obtained from the image forming apparatus whose power source is turned off by the controlling means.

20. The power source control system as set forth in claim 19, wherein the one or plural image forming apparatus(es) has/have a function for accepting the identification information of a person who can use each of them; and the power source control system further comprises:

use permission information obtaining means for obtaining the identification information of a person who can use each of the one or plural image forming apparatus(es) from them;

judging means for judging whether the identification information obtained by the use permission information obtaining means and the identification information stored in the present person identification information storing means coincide with each other; and means for outputting a warning in the case where the judgment results by the judging means do not coincide with each other.

21. A power source control apparatus for controlling turn-on or turn-off of a power source that can be controlled from the outside of each of one or plural controlled object apparatus(es) installed in a predetermined space where entrance/exit detecting means for detecting entrance and exit of a person is provided, comprising:

entrance/exit information obtaining means for obtaining from the entrance/exit detecting means entrance/exit information indicating entrance and exit of the person who enters to and exits from the predetermined space: and controlling means for controlling turn-on and turn-off of the power source of each of the one or plural controlled object apparatus(es) on the basis of the entrance/exit information obtained by the entrance/exit information obtaining means, wherein the controlling means judges whether at least one of the object apparatus(es) is in an ON state, and if not, then only a selected one of the object apparatus(es) having the highest frequency of use is turned ON.

22. The power source control apparatus as set forth in claim 21, further comprising:

use authorization storing means for storing identification information of a person and one or plural controlled object apparatus(es) which is available for each person in relation to each other; and identification information obtaining means for obtaining from the entrance/exit information obtained by the entrance/exit information obtaining means identification information for identifying a person who enters or leaves;

wherein the controlling means turns on a power source of the controlled object apparatus stored in the use authorization storing means in relation to the identification information obtained by the identification information obtaining means when the identification information obtaining means obtains the identification information of a person who enters, and turns off a power source of the controlled object apparatus stored in the use authorization storing means in relation to the identification information obtained by the identification information obtaining means when the identification information obtaining means obtains the identification information of a person who leaves.

23. The power source control apparatus as set forth in claim 22, further comprising: usage history storing means for storing a usage history of each of the one or plural controlled object apparatus(es);

wherein, when the identification information obtaining means obtains the identification information of the person who enters, the controlling means turns on a power source of one apparatus among the controlled object apparatuses stored in the use authorization storing means in relation to the identification information obtained by the identification information obtaining means in accordance with the usage histories stored in the usage history storing means.

24. The power source control apparatus as set forth in claim 23, further comprising power source state judging means for judging whether a power source of each of the one or plural controlled object apparatus(es) is turned on or turned off;

wherein, when the identification information obtaining means obtains the identification information of the person who enters, the controlling means makes the power source state judging means judge whether a power source of at least one apparatus among the controlled object apparatuses stored in the use authorization storing means in relation to the identification information obtained by the identification information obtaining means is turned on or not; and when a power source of at least one apparatus is turned on, the controlling means does not turn on the power source of the controlled object apparatus whose power source is turned off among the controlled object apparatuses stored in the use authorization storing means in relation to the identification information obtained by the identification information obtaining means.

25. The power source control apparatus as set forth in claim 24, further comprising present person identification information storing means for storing the identification information of a person who is present in the predetermined space on the basis of a detection result of the entrance/exit detecting means;

wherein, when the identification information obtaining means obtains the identification information of the person who leaves, and there are controlled object apparatuses stored in the use authorization storing means in relation to both of the identification information of a person who leaves obtained by the identification information obtaining means and the identification information stored in the present person identification information storing means, the controlling means does not turn off a power source of at least one apparatus among these controlled object apparatus.

26. The power source control apparatus as set forth in claim 25, further comprising stand-by information storing means for storing stand-by information indicating that each of the one or plural controlled object apparatus(es) is made into a power saving state;

wherein, when there are controlled object apparatuses stored in the use authorization storing means in relation to both of the identification information of a person who leaves obtained by the identification information obtaining means and the identification information stored in the present person identification information storing means, and there are the controlled object apparatuses whose stand-by information is stored in the stand-by information storing means among them, the controlling means turns off a power source of these apparatuses.

27. The power source control apparatus as set forth in claim 26, further comprising:

shift information obtaining means for obtaining shift information indicating that each of the one or plural controlled object apparatus(es) is shifted into a power saving state from each of them when they have not been used for a predetermined time;

power saving state judging means for, when the shift information obtaining means obtains the shift information from one controlled object apparatus among the one or plural controlled object apparatus(es), judging existence and nonexistence of a controlled object apparatus not in a power saving state other than the one controlled object apparatus among the controlled object apparatuses stored in the use authorization storing means in relation to the identification information stored in the present person identification information storing means; and power saving state shift prohibiting signal outputting means for, when the power saving state judging means judges that there is no controlled object apparatus satisfying a condition, outputting a shift prohibiting signal in order to prohibit the one controlled object apparatus from being made into a power saving state.

28. The power source control apparatus as set forth in claim 22, further comprising:

use state judging means for judging whether or not the each of one or plural controlled object apparatus(es) has/have not been used for a predetermined time; and power saving shift signal outputting means for outputting a shift signal in order to shift one or plural controlled object apparatus(es) which is/are judged not to be used for a predetermined time into a power saving state by the use state judging means.

29. The power source control apparatus as set forth in claim 27, further comprising:

operation information obtaining means for obtaining operation information indicating that a power source of each of the one or plural controlled object apparatus(es) is turned on or turned off from each controlled object apparatus; and means for outputting a warning when the operation information indicating that a power source is turned off is obtained from the controlled object apparatus whose power source is turned on by the controlling means, or when the operation information indicating that a power source is turned on is obtained from the controlled object apparatus whose power source is turned off by the controlling means.

30. The power source control apparatus as set forth in claim 29, wherein the one or plural controlled object apparatus(es) has/have a function for accepting the identification information of a person who can use each of them; and the power source control apparatus further comprises:

use permission information obtaining means for obtaining the identification information of a person who can use each of the one or plural controlled object apparatus(es) from them;

judging means for judging whether the identification information obtained by the use permission information obtaining means and the identification information stored in the present person identification information storing means coincide with each other; and means for outputting a warning when the judgment results by the judging means do not coincide with each other.

31. An image forming apparatus installed in a predetermined space including one or plural image forming apparatus (es), the predetermined space including entrance/exit detecting means for detecting entrance and exit of a person is provided, comprising:

switching means for switching turn-on and turn-off of a power source on the basis of the entrance/exit information, obtained by the entrance/exit detecting means, indicating entrance and exit of the person to and from the predetermined space, wherein it is judged if at least one of the image forming apparatus(es) is in an ON state, and if not, then only a selected one of the image forming apparatus(es) having the highest frequency of use is turned ON.

32. The image forming apparatus as set forth in claim 31, wherein the identification information for identifying the person who can use the apparatus has been judged in advance, when the identification information for identifying the person who enters obtained from the entrance/exit information coincides with the identification information which has been judged in advance, the switching means turns on a power source, and when the identification information for identifying the person who leaves obtained from the entrance/exit information coincides with the identification information which has been judged in advance, the switching means turns off a power source.

33. The image forming apparatus as set forth in claim 32, wherein the image forming apparatus has a function for accepting the identification information of the person who can use each image forming apparatus; and the image forming apparatus further comprises means for outputting a warning when the identification information for identifying the person who enters obtained by the entrance/exit information does not coincide with the accepted identification information.

34. A computer program product for controlling a computer that turns on or turns off power sources of one or plural image forming apparatus(es) installed in a predetermined space where entrance/exit detecting means for detecting entrance and exit of a person is provided, wherein the computer program product comprises:

a non-transitory computer readable storage medium having computer readable program code means embodied in the medium, the computer readable program code means comprising computer instruction means for:

obtaining entrance/exit information indicating that entrance and exit of the person to and from the predetermined space obtained from the entrance/exit detecting means; and turning on and turning off the power source of each of the one or plural image forming apparatus(es) on the basis of the obtained entrance/exit information, wherein it is judged whether at least one of the image forming apparatus(es) is in an ON state, and if not, then only a selected one of the image forming apparatus(es) having the highest frequency of use is turned ON.

35. The computer program product as set forth in claim 34, wherein the computer is connected to use authorization storing means for storing the identification of a person and one or plural image forming apparatus(es) which is available for each person in relation to each other;

the computer readable program code means further comprising computer instruction means for:

turning on a power source of an image forming apparatus stored in the use authorization storing means in relation to the obtained identification information when the identification information of the person who enters is obtained; and turning off the power source of the image forming apparatus stored in the use authorization storing means in relation to the obtained identification information when the identification information of the person who leaves is obtained.

* * * * *